US007823211B2

(12) United States Patent
Matsukawa et al.

(10) Patent No.: US 7,823,211 B2
(45) Date of Patent: Oct. 26, 2010

(54) LICENSE MOVING APPARATUS AND PROGRAM

(75) Inventors: Shinichi Matsukawa, Fuchu (JP); Akihiro Kasahara, Sambu-gun (JP); Hiroshi Suu, Chigasaki (JP); Taku Kato, Fuchu (JP); Kazunori Nakano, Tokyo (JP); Akira Miura, Sagamihara (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1142 days.

(21) Appl. No.: 11/138,444

(22) Filed: May 27, 2005

(65) Prior Publication Data

US 2005/0268344 A1  Dec. 1, 2005

Related U.S. Application Data

(63) Continuation of application No. PCT/JP03/15262, filed on Nov. 28, 2003.

(30) Foreign Application Priority Data

Nov. 29, 2002  (JP) .............................. 2002-349200

(51) Int. Cl.
 *G06F 7/04* (2006.01)
(52) U.S. Cl. .............................. 726/28; 726/30; 713/193
(58) Field of Classification Search .................. 713/193
 See application file for complete search history.

(56) References Cited

U.S. PATENT DOCUMENTS

| | | | | |
|---|---|---|---|---|
| 4,558,176 | A * | 12/1985 | Arnold et al. ................ 713/190 |
| 5,533,124 | A * | 7/1996 | Smith et al. .................... 705/57 |
| 6,813,709 | B1 * | 11/2004 | Benardeau .................. 713/172 |
| 6,832,319 | B1 * | 12/2004 | Bell et al. .................... 713/193 |
| 6,999,948 | B1 * | 2/2006 | Hatanaka et al. ............... 705/65 |
| 7,020,636 | B2 * | 3/2006 | Ohmori et al. ................. 705/51 |
| 7,181,629 | B1 * | 2/2007 | Hatanaka et al. ............ 713/194 |
| 7,203,966 | B2 * | 4/2007 | Abburi et al. .................. 726/29 |
| 7,227,952 | B2 * | 6/2007 | Qawami et al. ............. 380/201 |
| 7,350,238 | B2 * | 3/2008 | Abe et al. ....................... 726/29 |
| 7,478,248 | B2 * | 1/2009 | Ziv et al. ..................... 713/193 |
| 7,487,547 | B2 * | 2/2009 | Nakai et al. .................... 726/26 |
| 2001/0032088 | A1 | 10/2001 | Utsumi et al. |
| 2002/0032905 | A1 * | 3/2002 | Sherr et al. .................... 725/38 |

(Continued)

FOREIGN PATENT DOCUMENTS

JP  10-283270  10/1998

(Continued)

*Primary Examiner*—William R Korzuch
*Assistant Examiner*—Michael R Vaughan
(74) *Attorney, Agent, or Firm*—Oblon, Spivak, McClelland, Maier & Neustadt, L.L.P.

(57) ABSTRACT

A personal computer PC transmits to a server encoded user information and encoded license information, etc. contained in a secure recording medium. The server decodes the encoded license information to obtain license information. Then, the server deletes the encoded license information contained in the secure recording medium via the personal computer PC. The server decodes the decoded user information contained in a secure recording medium to obtain user information. Then, the server encodes the license information based on the user information to write the obtained encoded license information into the secure recording medium via the personal computer PC. In this manner, license information can be moved between two secure media and convenience can be improved.

17 Claims, 17 Drawing Sheets

U.S. PATENT DOCUMENTS

| | | | |
|---|---|---|---|
| 2003/0005135 A1* | 1/2003 | Inoue et al. | 709/229 |
| 2003/0018491 A1* | 1/2003 | Nakahara et al. | 705/1 |

FOREIGN PATENT DOCUMENTS

| | | |
|---|---|---|
| JP | 11-328033 | 11/1999 |
| JP | 2000-173182 | 6/2000 |
| JP | 2000-348003 | 12/2000 |
| JP | 2002-15146 | 1/2002 |
| JP | 2002-163235 | 6/2002 |
| JP | 2002-164881 | 6/2002 |
| JP | 2002-269279 | 9/2002 |

* cited by examiner

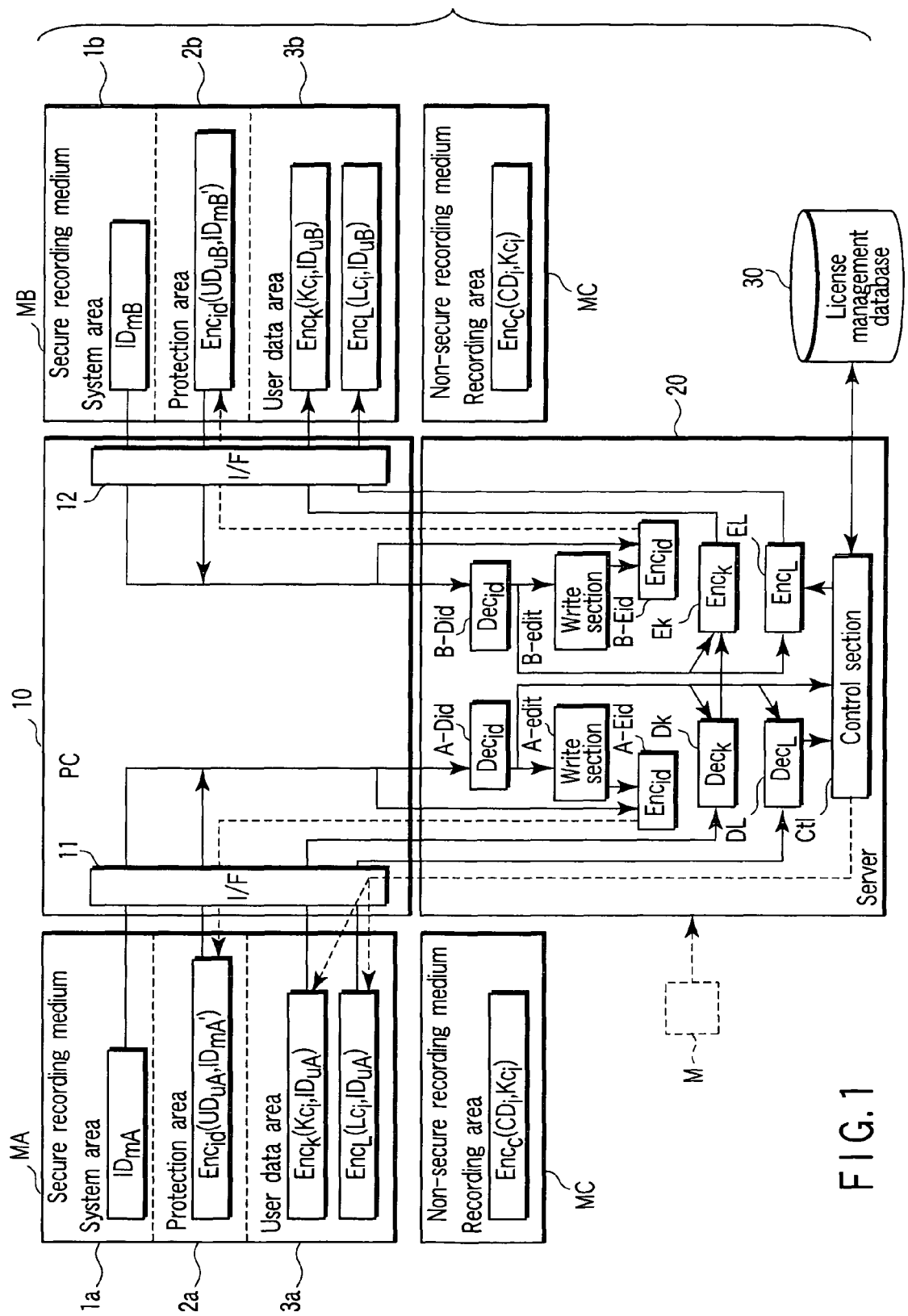
F I G. 1

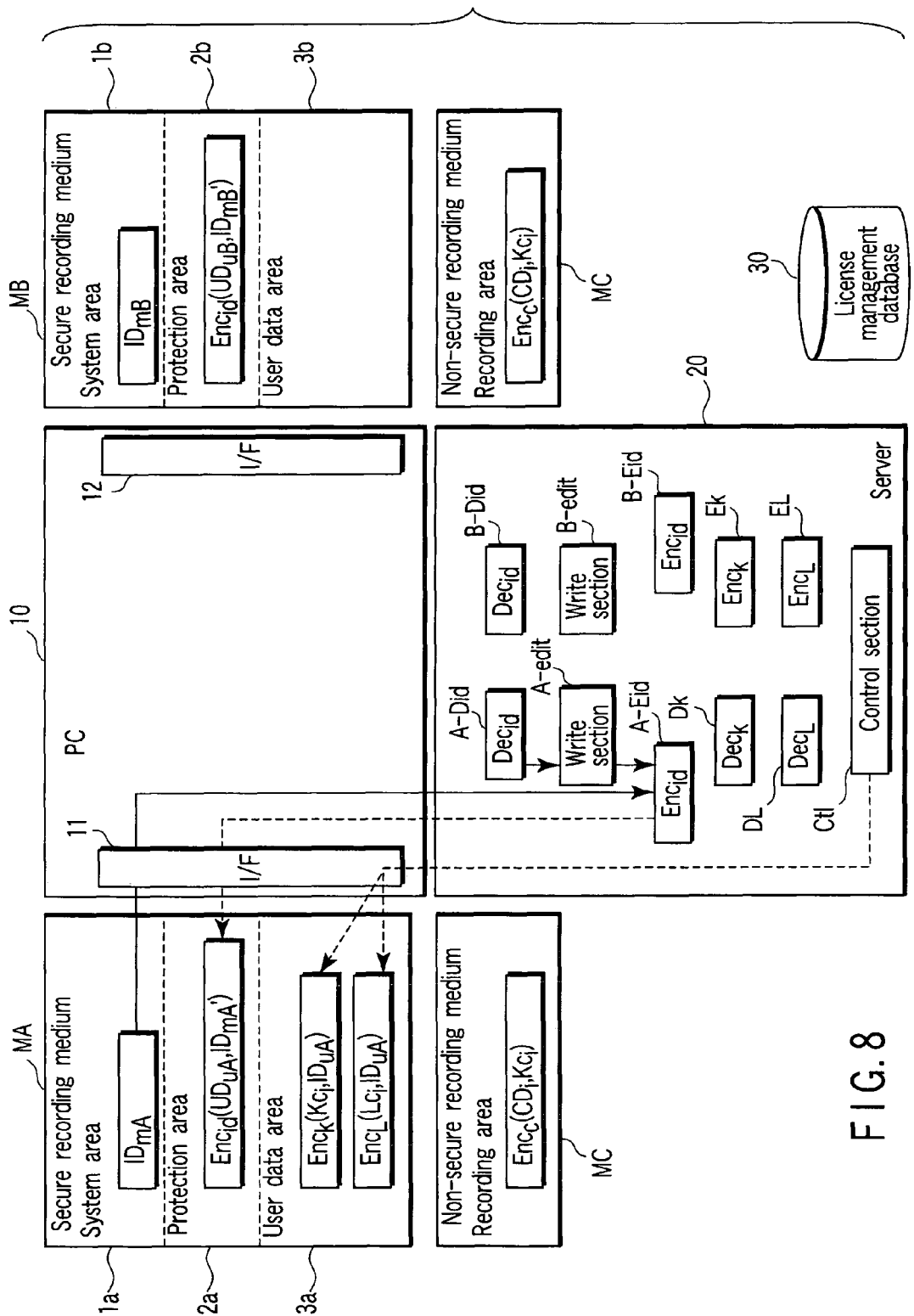
F I G. 8

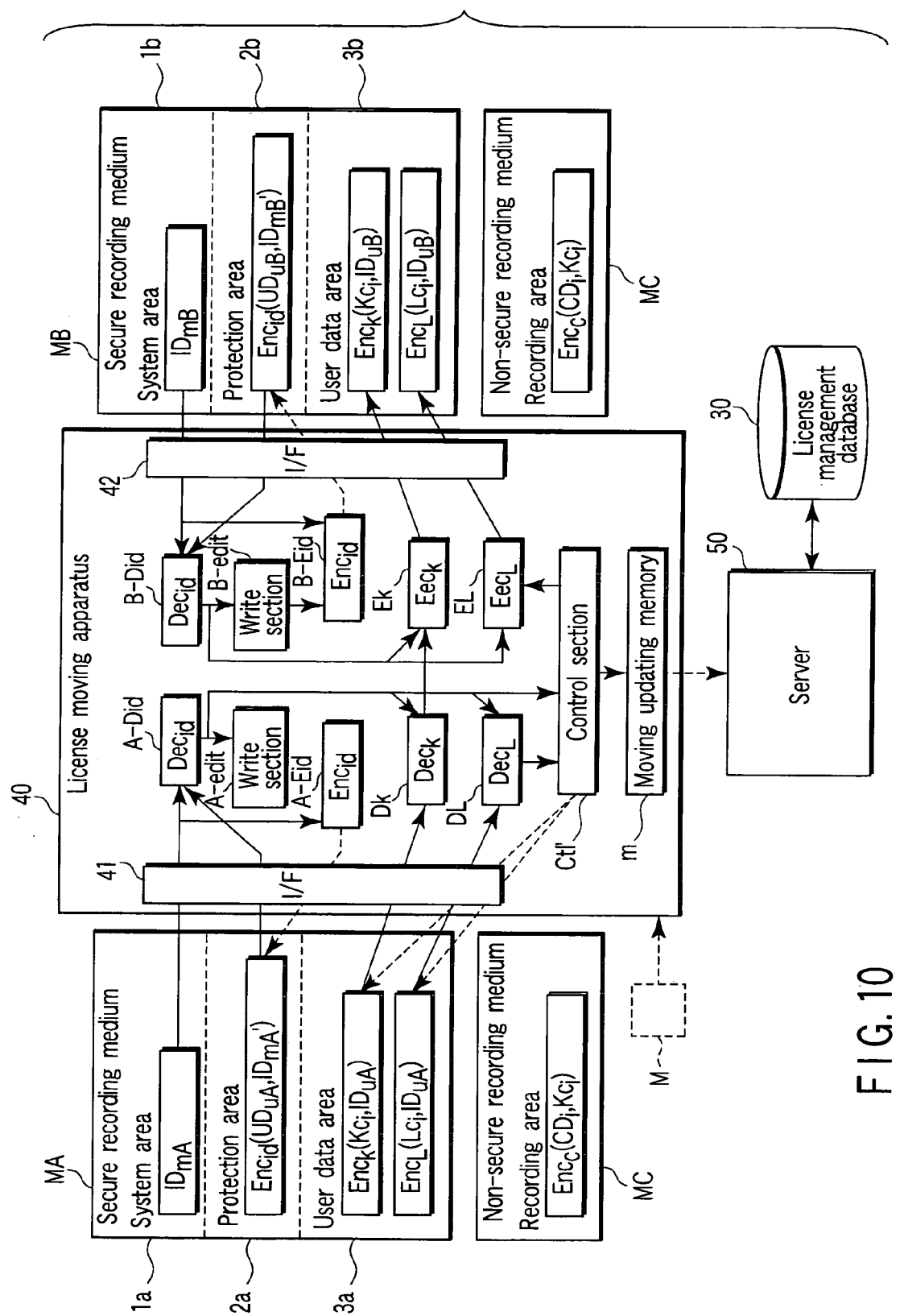
F I G. 10

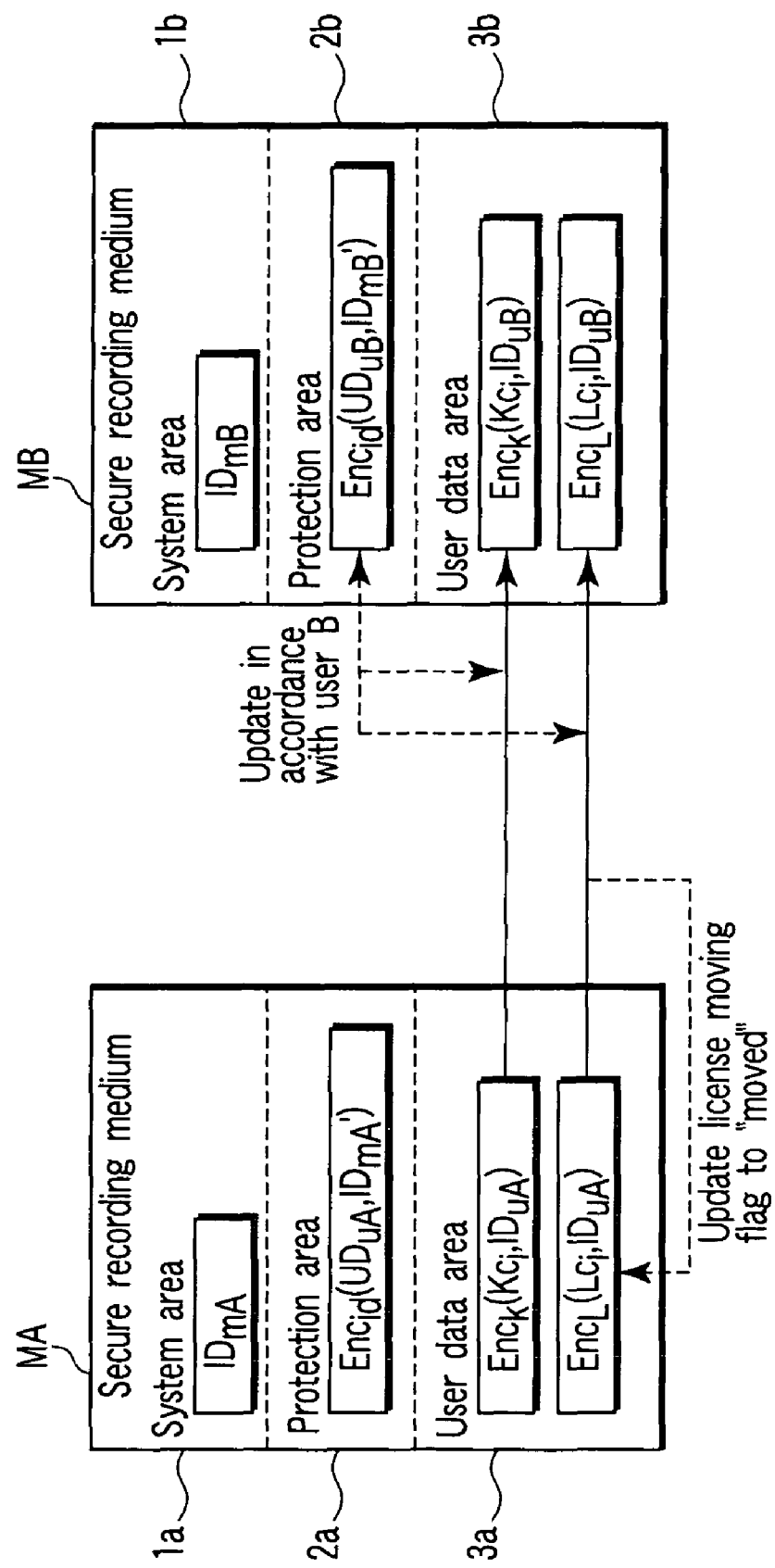
F I G. 14

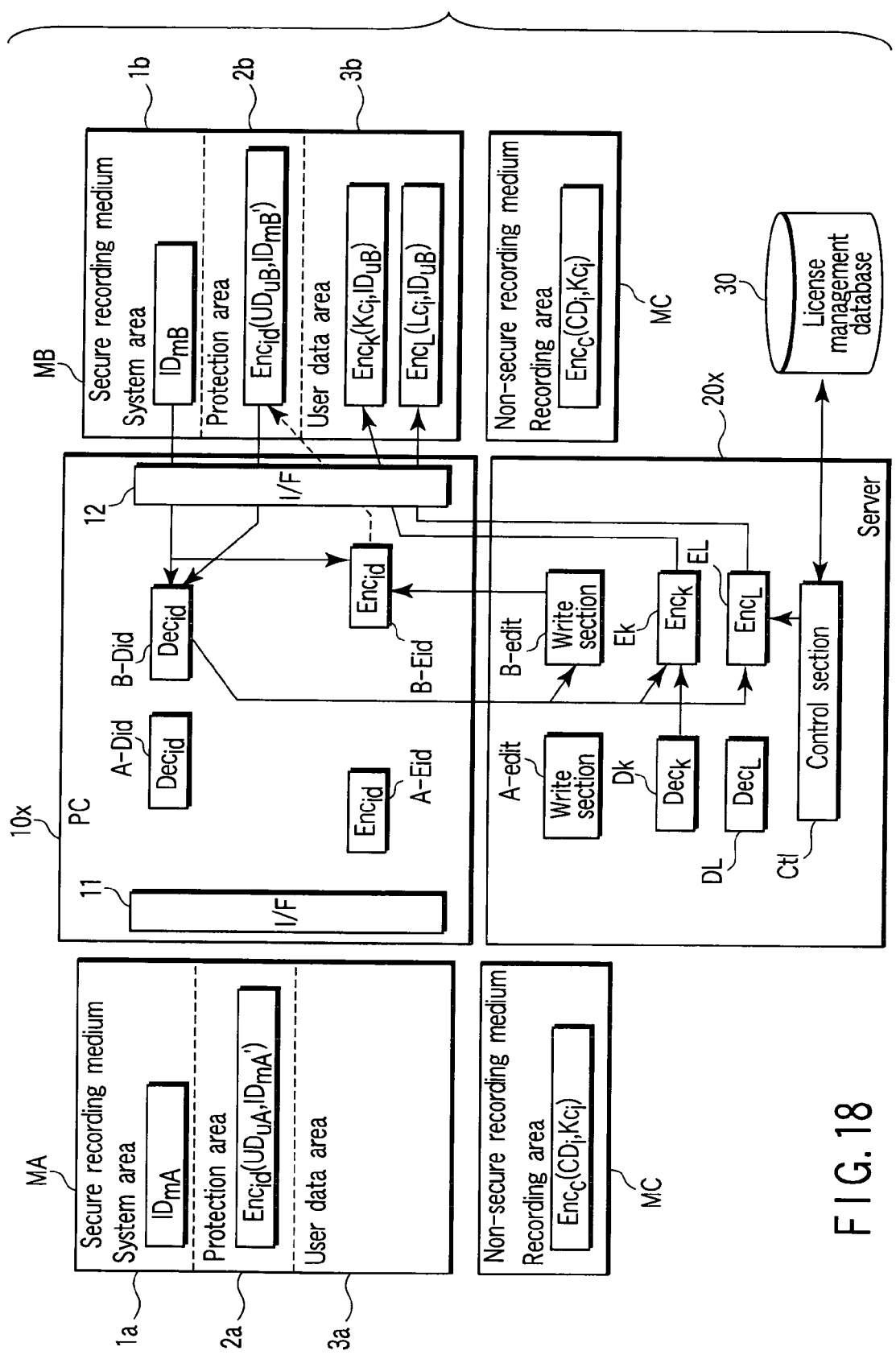
F I G. 18

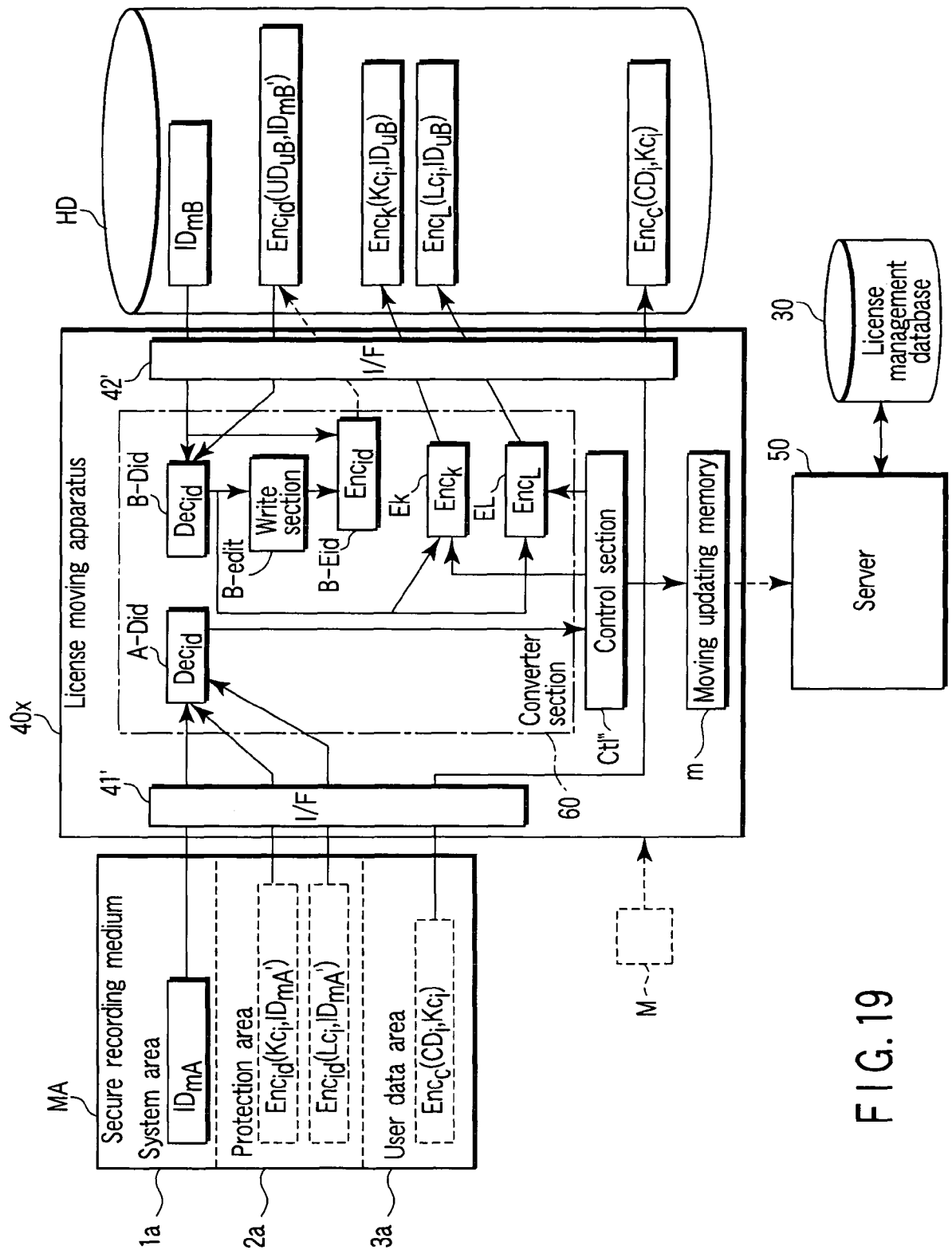
F I G. 19

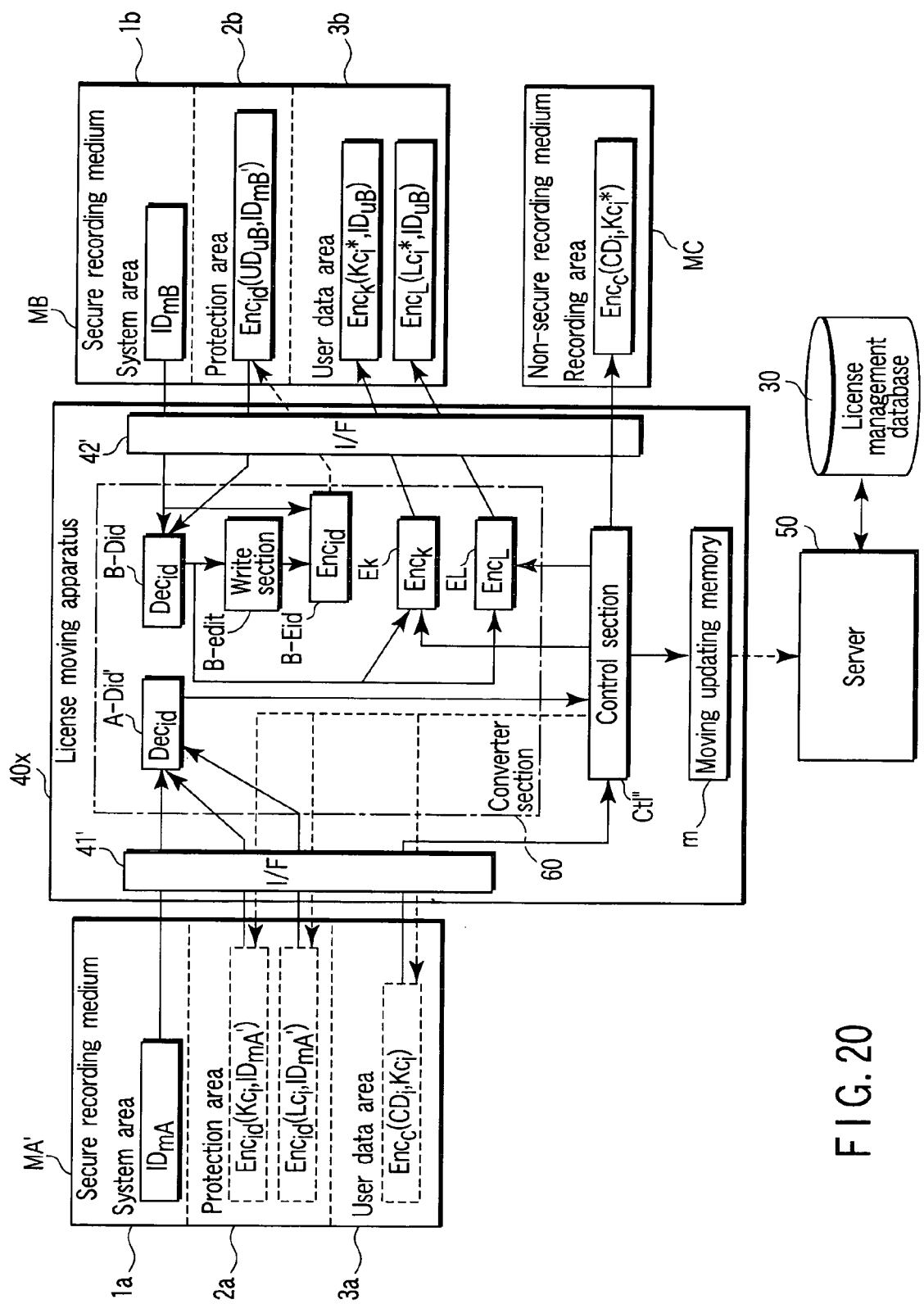
F I G. 20

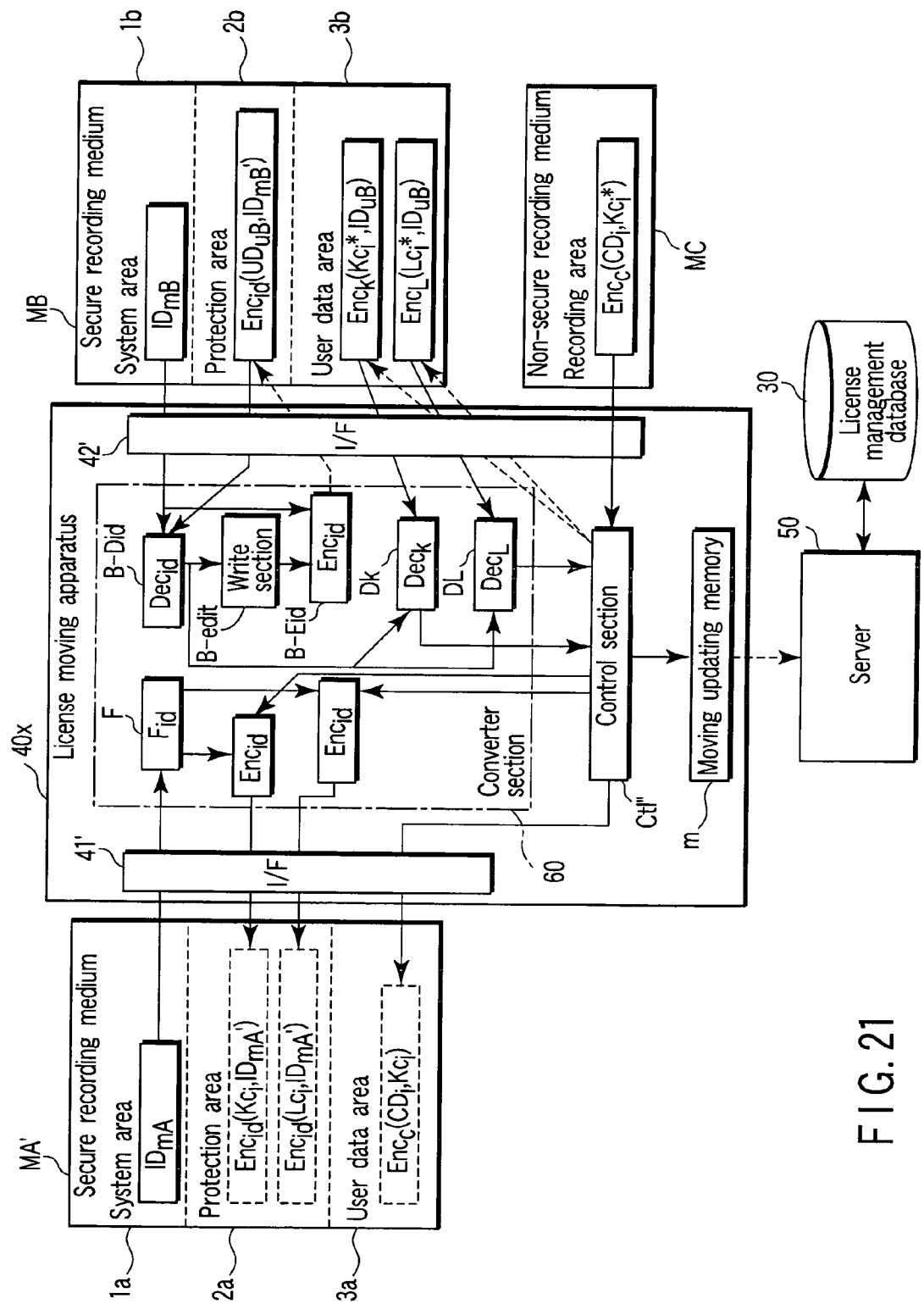
F I G. 21

LICENSE MOVING APPARATUS AND PROGRAM

CROSS-REFERENCE TO RELATED APPLICATIONS

This is a Continuation Application of PCT Application No. PCT/JP03/15262, filed Nov. 28, 2003, which was published under PCT Article 21(2) in Japanese.

This application is based upon and claims the benefit of priority from prior Japanese Patent Application No. 2002-349200, filed Nov. 29, 2002, the entire contents of which are incorporated herein by reference.

BACKGROUND OF THE INVENTION

1. Field of the Invention

The present invention relates to a license moving apparatus and program which, when license information for decoding encoded content is held in a recording medium, can move the license information into a recording medium and can improve convenience.

2. Description of the Related Art

In recent years, with development of the information society, it has been widely used that a content distribution system can distribute electrically produced content such as books, newspapers, music, or moving images (hereinafter, simply referred to as "content") and can play the content.

However, the electrically produced content is easily duplicated, and thus, an illegal action of ignoring content copyright is easily produced. From the viewpoint of disabling such an illegal action, a recording and playback system is employed in which the electrically produced content is generally encoded and recorded, and the encoded recorded content is decoded during playback. In addition, there is considered a system requiring license information for use in decoding during playback.

The license information of this type is stored in, for example, a predetermined portable recording medium, and the stored information is used to be read in a playback apparatus during playback.

Prior-art technical document information associated with an invention of this application includes Japanese Patent Application No. 2002-305141, although it is not an invention publicly known in the document.

However, a system requiring the license information as described above does not have any problem in general. According to discussion of the Inventor, it is considered that there occurs a demand for transferring license information from a predetermined recording medium to another recording medium such as a case where an attempt is made to assign to one's own decoded content to a friend.

Further, when such a demand has occurred, there is a possibility that a user feels the fact that convenience is low in the case where license information cannot be moved.

In terms of the viewpoint of moving content, there already exists a technique called a MOVE function of CPRM which enables moving content from a medium in which the content has been safely recorded to another medium. However, the MOVE function is a technique of making a move between recording media at the same time in the form that general content and license are indispensable, and thus, this technique cannot be utilized for movement of only license information.

BRIEF SUMMARY OF THE INVENTION

It is an object of the present invention to provide a license moving apparatus and program which can move license information from a predetermined recording medium to another recording medium and can improve convenience.

According to a first aspect of the present invention, there is provided a program for use in a server device for moving license information for playing encoded content from a first recording medium to a second recording medium via a terminal device, the program being stored in a computer readable storage medium, the program comprising: a first program code to cause a computer to execute a process of receiving from the terminal device a first medium identifier, first encoded user information and first encoded license information read from the first recording medium; a second program code to cause a computer to execute a process of decoding the first encoded user information based on the first medium identifier to obtain first user information; a third program code to cause a computer to execute a process of decoding the first encoded license information based on a first user ID contained in the first user information to obtain first license information; a fourth program code to cause a computer to execute a process of receiving from the terminal device a second medium identifier and second encoded user information read from the second recording medium; a fifth program code to cause a computer to execute a process of decoding the second encoded user information based on the second medium identifier to obtain second user information; a sixth program code to cause a computer to execute a process of rewriting the first license information into second license information based on the second user information; a seventh program code to cause a computer to execute a process of encoding the second license information based on a second user ID contained in the second user information to obtain second encoded license information; an eighth program code to cause a computer to execute a process of transmitting the second encoded license information to the terminal device; and a ninth program code to cause a computer to execute a process of storing a set of a second license ID included in the second license information and the second medium identifier and/or the second user ID.

According to a second aspect of the present invention, there is provided a license moving apparatus for moving license information for playing encoded content from a first recording medium to a second recording medium, the apparatus comprising: means for reading a first medium identifier, first encoded user information, and first encoded license information from the first recording medium; means for decoding the first encoded user information based on the first medium identifier to obtain first user information; means for decoding the first encoded license information based on a first user ID contained in the first user information to obtain first license information; means for reading a second medium identifier and second encoded user information from the second recording medium; means for decoding the second encoded user information based on the second medium identifier to obtain second user information: means for rewriting the first license information into second license information based on the second user information; means for encoding the second license information based on a second user ID contained in the second user information to obtain second encoded license information; means for writing the second encoded license information into the second recording medium; a memory which temporarily stores a set of a second license ID included in the second license information and the second medium identifier and/or the second user ID; and means for regularly or irregularly transmitting the content stored in the memory.

Therefore, according to the first and second aspects of the invention, license information can be moved from a predetermined recording medium to another recording medium, and convenience can be improved.

According to the above-described first and second aspects, each apparatus has been expressed as a "program" or an "apparatus". However, it goes without saying that each apparatus or a set of these apparatuses may be expressed as an "apparatus", a "system", a "method", a "computer readable recording medium" or a "program".

BRIEF DESCRIPTION OF THE SEVERAL VIEWS OF THE DRAWING

FIG. 1 is a schematic diagram showing a configuration of a license moving system and a recording medium according to a first embodiment of the present invention.

FIGS. 7 to 9 are schematic diagrams for explaining an operation in the embodiment.

FIG. 10 is a schematic diagram showing a configuration of a license moving system and a recording medium according to a second embodiment of the present embodiment.

FIG. 14 is a schematic diagram for explaining a license moving flag in the embodiment.

FIGS. 16 to 18 are schematic diagrams for explaining an operation in the embodiment.

FIG. 19 is a schematic diagram showing a modified configuration of the license moving system and the recording medium according to each of the embodiments of the invention.

FIGS. 20 and 21 are schematic views each showing the modified configuration of FIG. 19.

DETAILED DESCRIPTION OF THE INVENTION

Figure 2:
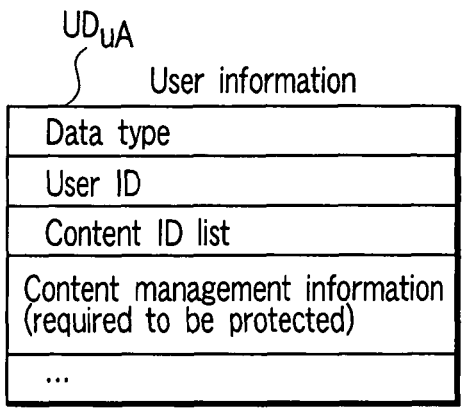
FIG. 2 is a schematic diagram showing a configuration of user information in the embodiment.

Hereinafter, embodiments of the present invention will be described with reference to the accompanying drawings. Expressions used in the present specification are described in the listings.

$ID_{mA}$: medium identifier of recording medium mA $ID_{mA'}$: medium identifier which corresponds to medium identifier of recording medium mA on a one to one basis.

$ID_{mA'}$ denotes a value generated from $ID_{mA}$ in accordance with a predetermined converting process. A predetermined converting process is provided as a process carried out when a normal device reads $ID_{mA}$. In addition, in the present specification, "A" in reference numerals denotes a move source, and "B" in reference numerals denotes a move destination.

$UD_{uA}$: user information on user uA $ID_{uA}$: user identifier of user uA included in user information $UD_{uA}$ $Kc_i$: content key information obtained when content identifier (hereinafter, referred to as content ID) is "i"

$CD_i$: content information obtained when content ID is "i"

The content key information $Kc_i$ and the content information $CD_i$ are associated with each other in accordance with content ID embedded in advance in a header or the like.

$LC_i$: license information obtained when content ID is "i"

$Enc\_x (A, B)$: information obtained when A is encoded in encoding system "x" using key of B $Enc\_x, Dec\_x$: encoding and decoding system in x system, respectively Each of the following embodiments will be described by using the above expression system.

Each of the embodiments relates to a license moving system which can move license information and shows an example of a move mode in an online state with a server or a move mode in an off-line state. A license information moving mode will be described by way of example of movement between copyright owners A and B in a same system. By providing a converting function, movement in another system (for example, only conversion of a recording system in the same copyright owner or conversion of a recording system and movement between copyright owners A and B) can be carried out. In addition, a user's apparatus such as a personal computer PC or a license moving apparatus in each of the embodiments may provide a function of playing encoded content without being limited to an apparatus used only for license movement.

First Embodiment

FIG. 1 is a schematic diagram showing a configuration of a license moving system and a recording medium according to a first embodiment of the present invention. In the license moving system, a personal computer (hereinafter, referred to as a personal computer PC) 10 capable of reading/writing secure recording media MA, MB is connected to a server 20, and the server 20 is configured to be connected to a license management database (hereinafter, referred to as a license management DB) 30.

Here, in the secure recording medium MA, for example, an SD card can be used, and a system area 1a, a protection area 2a, and a user data area 3a are provided.

The system area 1a is provided as an area in which a medium identifier $ID_{mA}$ which is identification information specific to a medium is held to be readable from the personal computer PC 10.

The protection area 2a is provided as an area in which a general user cannot read data directly, and encoded user information $Enc_{id}(UD_{uA}, ID_{mA'})$ having encoded user information $UD_{uA}$ is stored by a medium identifier $ID_{mA'}$ which corresponds to the medium identifier $ID_{mA}$.

Here, the user information $UD_{uA}$, as shown in FIG. 2, includes a data type, a user ID (user identifier), a content ID list, and content management information. The content ID list is provided as a list obtained by recording a content ID whose user owns a copyright from the viewpoint of eliminating an illegal key and an illegal license. The content management information is provided as attribute information (protection management information) to be protected from among the content attribute information. Although information or the like for managing an attribute used for use limitation such as, for example, a playback count, a playback time, or a print output count can be applied, arbitrary information which is not desired to be written by a user can be applied without being limited thereto.

The user data area 3a is provided as an area in which a general user can read data directly, and there are stored: an encoded content key $Enc_k(kc_i, ID_{uA})$ obtained when a content key $Kc_i$ is encoded by a user identifier $ID_{uA}$ contained in the user information $UD_{uA}$ and encoded license information $Enc_L$($Lc_i$, $ID_{uA}$) obtained when license information $Lc_i$ is encoded by the user identifier $ID_{uA}$. The encoded content key and the encoded license information may be stored in another area which can be accessed by a general user without being limited to the user data area 3a.

Figure 3:
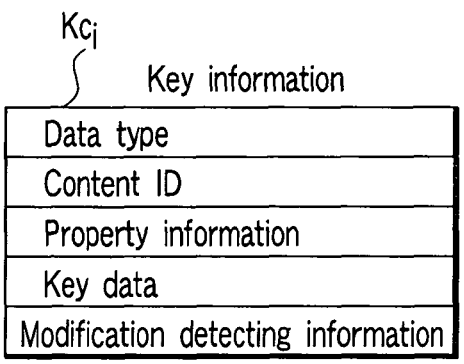
FIG. 3 is a schematic diagram showing a configuration of key information in the embodiment.

Here, the content key information $Kc_i$, as shown in FIG. 3, includes a data type, a content ID (content identifier), property information, key data, and modification detecting information. The modification detecting information is provided from the viewpoint of protecting information stored in an area other than the protection area 2a. For example, a MAC, a hash value, a digital signature or the like can be used. The modification detecting information is provided to license information without being limited to the key information $Kc_i$.

Figure 4:
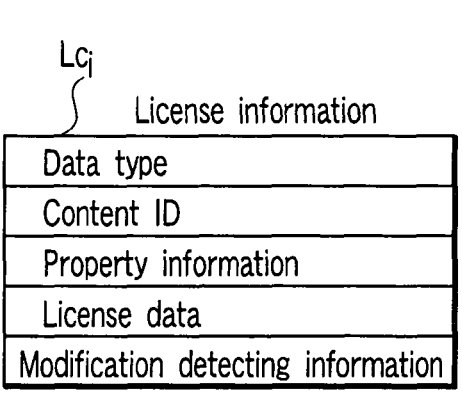
FIG. 4 is a schematic diagram showing a configuration of license information in the embodiment.
Figure 5:
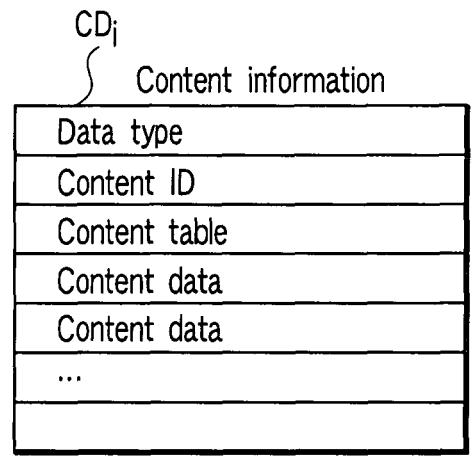
FIG. 5 is a schematic diagram showing a configuration of license moving information in the embodiment.

The license information $Lc_i$, as shown in FIG. 4, includes a data type, a license ID (license identifier), property information, license data, and modification detecting information. Here, the property information such as a move count, for example, can be used. The license data includes, for example, a user copyright owner, a use rule and any other additional information.

The encoded content key and the encoded license information may be stored in another area which can be accessed by a general user without being limited to the user data area 3a.

The secure recording medium MB is configured in the same way as the secure recording medium MA, although the content of data are different. In addition, a non-secure recording medium MC stores in advance encoded content data $Enc_C$($CD_i$, $Kc_i$) obtained when the content data $CD_i$ is encoded by the content key $Kc_i$, and reads the data from a playback apparatus (not shown).

The secure recording media MA, MB and the non-secure recording medium MC may be either of a physically different medium and an identical medium. This fact is identical in the following embodiments.

The personal computer PC 10 has a general computer function, and can read/write the secure recording media MA, MB via card slots (I/F) 11, 12 which serve as an interface device and can communicate with the server 20. In the present embodiment, the personal computer functions as a device which passes data between each of the secure recording media MA, MB and the server 20. Although the card slots 11, 12 are identical to each other, these card clots are described as two slots for clarity of explanation.

The server 20 is composed of: license moving software installed in one's own computer in advance; a memory for temporarily storing one function and a processing result of a CPU (not shown) operated in accordance with the software; and the like. The server 20 comprises: decoding sections $A_{-Did}$, $B_{-Did}$ and encoding sections $A_{-Eid}$, $B_{-Eid}$ of a system "id"; rewrite sections $A_{-edit}$, $B_{-edit}$ of user information $UD_{uA}$, $UD_{uB}$; an encoding section $D_k$ and a decoding section $E_k$ of a system "k"; a decoding section $D_L$ and an encoding section $E_L$ of a system L; and a control section Ctl.

The license moving software of the server 20 may be achieved by installing a program stored in an external storage medium M as indicated by the dashed line in FIG. 1 or may be achieved by a ROM or the like having a program incorporated therein in advance. This also applies to each of the following embodiments.

Further, the encoding systems "id", "k", "L", "c" may be modified to a system identical to another one or only a set of arbitrary encoding systems may be modified to a system identical to another one. In addition, the server 20 may use a hardware circuit for encoding and decoding if desired, without being limited to the server which consists of software and one function of a CPU.

Here, the decoding section $A_{-Did}$ has a function of: decoding encoded user information $Enc_{id}$($UD_{uA}$, $ID_{mA'}$) read from the secure recording medium MA similarly based on the medium identifier $ID_{mA}'$ which corresponds to the medium identifier $ID_{mA}$ read from the secure recording medium MA; and delivering the obtained user information $UD_{uA}$ to the decoding sections $D_k$, $D_L$, the control section Ctl, and the rewrite section $A_{-edit}$. Note that the decoding section $B_{-Did}$ also has a similar function to the decoding section $A_{-Did}$. In addition, both of the decoding sections $A_{-Did}$, $B_{-Did}$ may be provided as one decoding section.

The rewrite section $A_{-edit}$ has: a function of carrying out rewrite processing so as to delete a content ID which corresponds to the license information $Lc_i$ from among the content ID list included in the user information $UD_{uA}$ obtained by the decoding section $A_{-Did}$; and a function of delivering the rewritten user information $UD_{uA}$ to the decoding section $A_{-Eid}$. Note that the rewrite section $B_{-Did}$ also has a similar function to the rewrite section $A_{-Did}$. In addition, both of the rewrite sections $A_{-edit}$, $B_{-edit}$ may be provided as one rewrite section.

The encoding section $A_{-Eid}$ has a function of encoding the user information $UD_{uA}$ received from the rewrite section $A_{-edit}$ based on the medium identifier $ID_{mA}$, obtained by the decoding section $A_{-Did}$, and outputting the obtained encoded user information $Enc_{id}$($UD_{uA}$, $ID_{mA'}$) so as to be overwritten and updated in the secure recording medium MA.

The decoding section Dk has: a function of decoding the decoded content key $Enc_k$($Kc_i$, $ID_{uA}$) read from the secure recording medium MA based on the user identifier $ID_{uA}$ included in the user information $UD_{uA}$ obtained by the decoding section $A_{-Did}$; and a function of storing the content key $Kc_i$ obtained by decoding in an internal memory (not shown).

The decoding section $D_L$ has: a function of decoding the encoding license $Enc_L$($Lc_i$, $ID_{uA}$) read from the secure recording medium MA based on the user identifier $ID_{uA}$ included in the user information $UD_{uA}$ obtained by the decoding section $A_{-Did}$; and a function of delivering the license information $Lc_i$ obtained by decoding to the control section Ctl.

The control section Ctl has: a function of checking whether or not the license information $Lc_i$ obtained by the decoding section $D_L$ is invalid while referring to the license management DB 30; a function of carrying out an illegal process if the information is invalid, and moving to a next deleting process if the information is valid; a function of carrying out a deleting process of deleting the encoded content key $Enc_k$($Kc_i$, $ID_{uA}$) and the encoded license information $Enc_L$($Lc_i$, $ID_{uA}$) contained in the secure recording medium MA; a function of rewriting the license information $Lc_i$ based on the content of moving the license information after the deleting process; a function of delivering the rewritten license information $Lc_i$ to the encoding section $E_L$; and a function of updating the license management DB 30 based on the content of moving the license information $Lc_i$.

The encoding section Ek has: a function of encoding the content key $Kc_i$ obtained by the decoding section Dk and stored in an internal memory (not shown) based on a user identifier $ID_{uB}$ included in user information $UD_{uB}$ obtained by the decoding section $B_{-Did}$, and obtaining encoded content key $Enc_k$($Kc_i$, $ID_{uB}$); and a function of delivering the encoded content key $Enc_k$($Kc_i$, $ID_{uB}$) to be written into the secure recording medium MB.

The encoding section $E_L$ has a function of encoding the license information received from the control section Ctl based on the user identifier $ID_{uB}$ included in the user information $UD_{uB}$ obtained by the decoding section $B_{-Did}$ and obtaining encoded license information $Enc_L(Lc_i, ID_{uB})$; and a function of delivering the encoded license information $Enc_L(Lc_i, ID_{uB})$ to be written into the secure recording medium MB.

The license management DB 30 is provided as a database capable of carrying out read/writing from the server 20. A specific unique ID and a license ID are stored to be associated with each other. As a unique ID, for example, a medium identifier $ID_m$, a device ID, a user ID or the like can be used. The device ID is provided as an ID of the personal computer PC 10 in the present embodiment, and in the embodiments described later, an ID of a license moving apparatus is obtained. The user ID may be anonymous.

Figure 6:
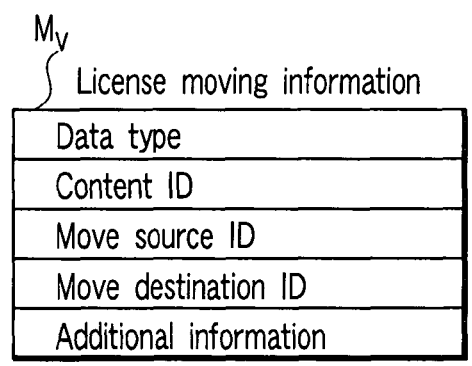
FIG. 6 is a schematic diagram showing a configuration of content information in the embodiment.

In addition, the license management DB 30, as shown in FIG. 6, may include license moving information Mv. The license moving information include a data type, a content ID, a move source ID, a move destination ID, and additional information. The move source ID and the move destination ID correspond to unique IDs described previously. The additional information is provided as additional information such as a move date and time.

Now, an operation of the license moving system configured as described above will be described with reference to FIGS. 7 to 9. Roughly speaking, moving the license information Lc is carried out sequentially in order of "read process from recording medium MA", "deleting process for recording medium MA", and "writing process for recording medium MB". Hereinafter, a description will be given in accordance with this sequence.

(Read Process from Recording Medium MA)

Figure 7:
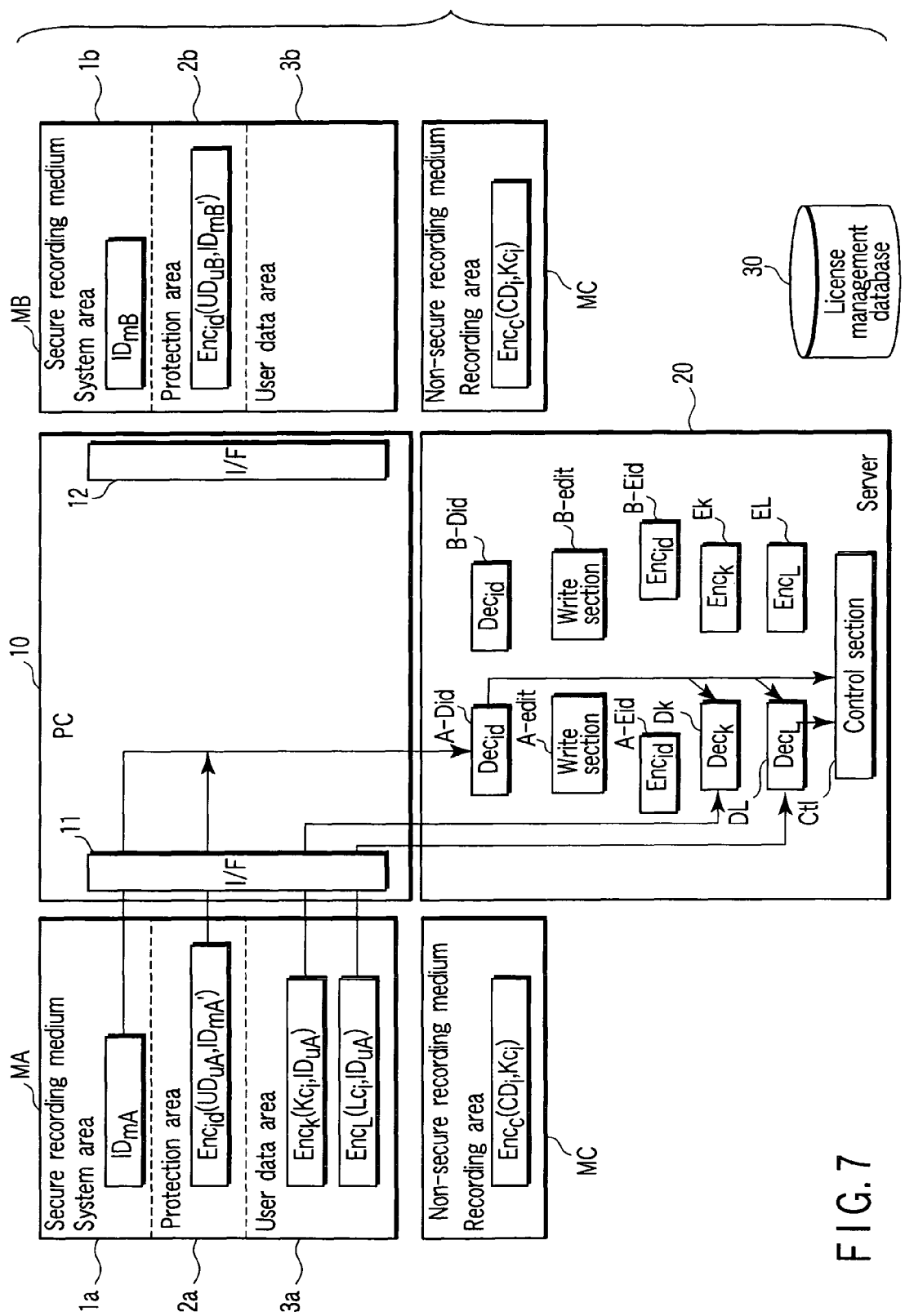

As shown in FIG. 7, the personal computer PC 10 transmits to the server 20: the medium identifier $ID_{mA}$, which corresponds to the medium identifier $ID_{mA}$ read from the secure recording medium MA; encoded user information $Enc_{id}(UD_{uA}, ID_{mA'})$; encoded content key $Enc_k(Kc_i, ID_{uA})$, and encoded license information $Enc_k(Lc_i, ID_{uA})$ by operation of a user A.

In the server 20, the decoding section $A_{-Did}$ decodes the encoded user information $Enc_{id}(UD_{uA}, ID_{mA'})$ based on the medium identifier $ID_{mA}'$ and obtains the user information $UD_{uA}$.

Then, the server 20 uses the user identifier $ID_{uA}$ included in the user information $UD_{uA}$, so that the decoding section $D_k$ decodes the encoded content key $Enc_k(Kc_i, ID_{uA})$ to obtain the content key $Kc_i$ and the decoding section $D_L$ decodes the encoded license information $Enc_L(Lc_i, ID_{uA})$ to obtain the license information $Lc_i$. The license information $Lc_i$ is delivered to the control section Ctl and the content key $Kc_i$ is held in an internal memory (not shown).

The control section Ctl checks whether or not the license information $Lc_i$ is valid while referring to the license management DB 30. The control section carries out an invalidating process if the information is invalid and moves to a next deleting process if the information is valid. The invalidating process includes, for example, stopping license movement or the like.

(Deleting Process for Recording Medium MA)

In the server 20, as shown in FIG. 8, the rewrite section $A_{-edit}$ carries out a rewriting process so as to delete a content ID which corresponds to the license information $Lc_i$ from among the content ID list of the user information $UD_{uA}$, and delivers the user information $UD_{uA}$ after rewritten to the encoding section $A_{-Eid}$.

The encoding section $A_{-Eid}$ encodes the user information $UD_{uA}$ after rewritten based on the medium identifier $ID_{mA}'$ described previously to obtain the encoded user information $Enc_{id}(UD_{uA}, ID_{mA'})$.

The server 20 overwrites and updates this encoded user information $Enc_{id}(UD_{uA}, ID_{mA'})$ into the secure recording medium MA via the personal computer PC 10.

Thereafter, in the server 20, the control section Ctl deletes the encoded content key $Enc_k(Kc_i, ID_{uA})$ and encoded license information $Enc_L(Lc_i, ID_{uA})$ contained in the secure recording medium MA via the personal computer PC 10.

(Writing Process for Recording Medium MB)

In the server 20, the control section Ctl rewrites, for example, property information (for example, a move count), license data (for example, a use owner), and modification detecting information contained in the license information $Lc_i$.

Figure 9:
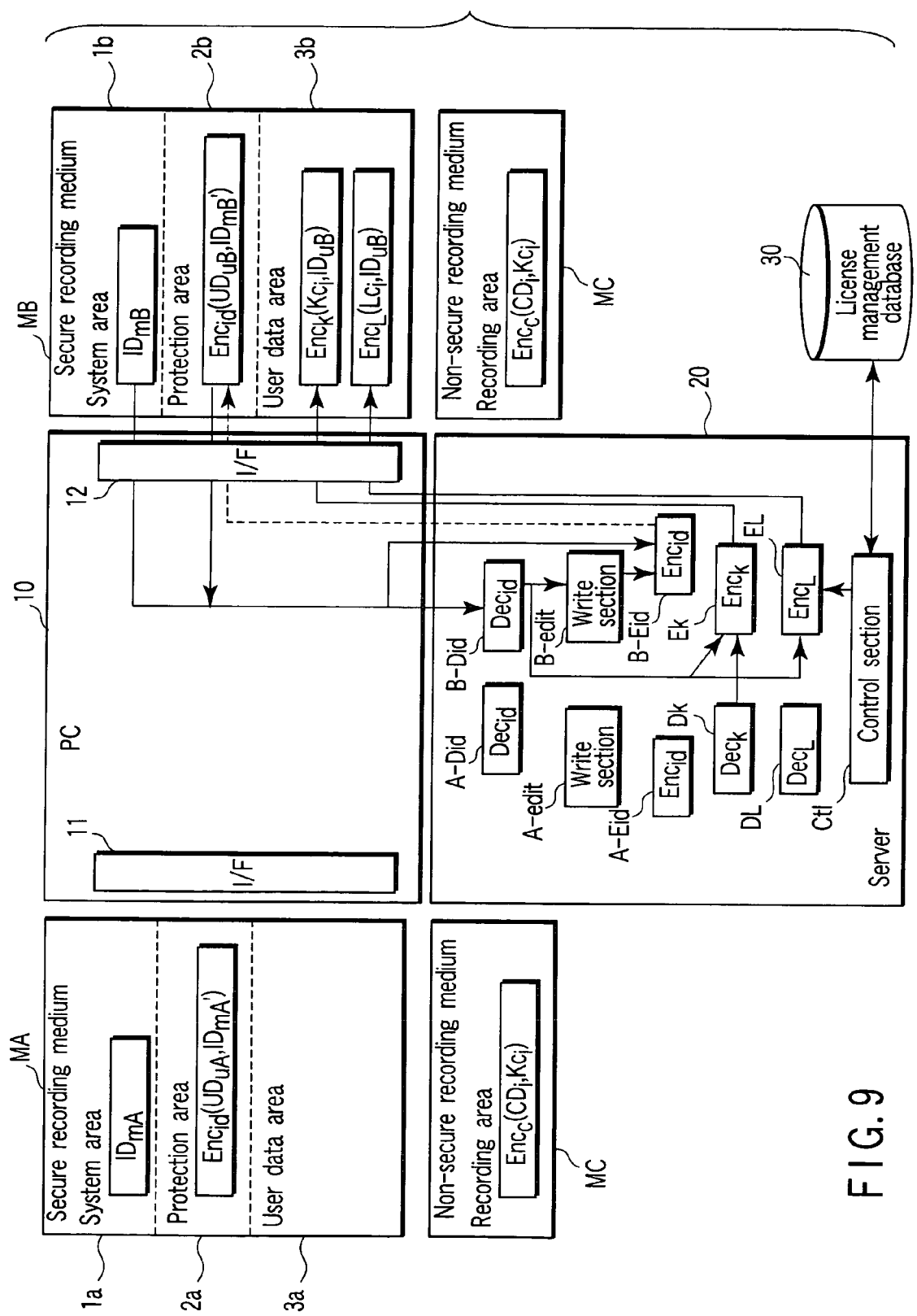

As shown in FIG. 9, the server also reads a medium identifier $ID_{mB}'$ and encoded user information $Enc_{id}(UD_{uB}, ID_{mB'})$ which correspond to a medium identifier $ID_{mB}$ from the secure recording medium MB via L the personal computer PC 10.

Next, in the server 20, the decoding section $B_{-Did}$ decodes the encoded user information $Enc_{id}(UD_{uB}, ID_{mB'})$ based on the medium identifier $ID_{mA}'$ and obtains user information $UD_{uB}$.

Further, in the server 20, the rewrite section $B_{-edit}$ carries out a rewriting process so as to add a content ID which corresponds to the license information $Lc_i$ from among the content ID list of the user information $UD_{uB}$, and delivers the user information $UD_{uB}$ after rewritten to the encoding section $B_{-Eid}$.

The encoding section $B_{-Eid}$ encodes the user information $UD_{uB}$ after rewritten based on the medium identifier $ID_{mB}'$ described previously and obtains the encoded user information $Enc_{id}(UD_{uB}, ID_{mB'})$.

The server 20 overwrites and updates this encoded user information $Enc_{id}(UD_{uB}, ID_{mB'})$ into the secure recording medium MB via the personal computer PC 10.

In addition, in the server 20, the encoding section Ek encodes the content key $Kc_i$ obtained by the decoding section Dk described previously and stored in an internal memory (not shown) based on the user identifier $ID_{uB}$ included in the user information $UD_{uB}$, and obtains the encoded content key $Enc_k(Kc_i, ID_{uB})$. Then, the server 20 writes this encoded content key $Enc_k(UD_{uB}, ID_{uB})$ into the secure recording medium MB via the personal computer PC 10.

Similarly, in the server 20, the control section Ctl described previously delivers the license information $Lc_i$ to the encoding section $E_L$. The encoding section $E_L$ encodes the license information $Lc_i$ based on the user identifier $ID_{uB}$, and obtains the encoded license information $Enc_L(Lc_i, ID_{uB})$.

Subsequently, the server 20 writes the encoded license information $Enc_L(Lc_i, ID_{uB})$ into the secure recording medium MB via the personal computer PC 10.

Thereafter, in the server 20, the control section Ctl updates the license management DB 30 based on the content of moving the license information $Lc_i$ as described above.

As described above, according to the present embodiment, the personal computer PC 10 capable of reading/writing the secure recording media MA, MB transmits the content of recording the secure recording media MA, MB to the server 20, whereby the license information $Lc_i$ can be moved from the predetermined secure recording medium MA to another secure recording medium MB in an online state and convenience can be improved.

Further, while the present embodiment has described a case of deleting license information $Lc_i$ contained in a move source, license information $Lc_i$ contained in a move destination may be rewritten and modified so as to disable movement, as described later in FIG. 14 without being limited thereto. In this manner, mutual modification between a configuration of deleting the license information $Lc_i$ and a configuration of disabling movement can be carried out in the same way in each of the following embodiments.

The server 20 can also manage a move state of the license information $Lc_i$, thereby enabling billing when the license information $Lc_i$ is moved.

Moreover, the server 20 can manage a move state of the license information $Lc_i$, thereby enabling reissuing of the content key $Kc_i$ or license information $Lc_i$ when the secure recording medium MA having the license information $Lc_i$ recorded therein is lost or damaged.

Second Embodiment

FIG. 10 is a schematic diagram showing a configuration of a license moving system and a recording medium according to a second embodiment of the present invention. Like elements shown in FIG. 1 are designated by reference numerals, and a detailed description is omitted here. This section primarily describes constituent elements different from those shown in FIG. 1. In each of the embodiments and its modified mode as well, a duplicate description is omitted here similarly.

That is, this embodiment is a modified example of the first embodiment, wherein moving the license information $Lc_i$ is achieved in an off-line state separated from a server.

Specifically, a license moving apparatus 40 and a server 50 are provided instead of the personal computer PC 10 and the server 20 described above.

Here, the license moving apparatus 40 comprises: a card slots 41, 42; decoding sections $A_{-Did}$, $B_{-Did}$; encoding sections $A_{-Eid}$, $B_{-Eid}$; rewrite sections $A_{-edit}$, $B_{-edit}$; a decoding section $D_k$; an encoding section $E_k$; a decoding section $D_L$; an encoding section $E_L$; a control section Ctl'; and a moving updating memory "m".

Here, the card slots 41, 42 are identical to the card slots 11, 12 described previously.

The decoding sections $A_{-Did}$, $B_{-Did}$, the encoding sections $A_{-Eid}$, $B_{-Eid}$, the rewrite sections $A_{-edit}$, $B_{-edit}$, the decoding section $D_k$, the encoding section $E_k$, the decoding section $D_L$, and the encoding section $E_L$ have the above-described functions.

The control section Ctl' is for writing license move information Mv indicating update content instead of the function of updating the license management DB of the functions of the control section Ctl described above.

The moving updating memory "m" temporarily holds the license move information Mv written from the control section Ctl'.

The license moving apparatus 40 transmits the license move information Mv contained in the moving updating memory "m" to the server 50 at a periodic or arbitrary timing, whereby management by the server 50 can be carried out with respect to license information $Lc_i$ moved in an off-line state. After transmission of the license move information Mv, the moving updating memory "m" is processed to be deleted under the control of the license move apparatus 40. However, this deleting process is not mandatory, and the license move information Mv after transmitted may be naturally deleted by overwriting the information. In addition, the information Mv may be stored as a history without deleting it.

The server 50 has a function of updating the license management DB 30 based on the license move information Mv from the license move apparatus 40 instead of the function of the server 20 described previously.

Figure 11:
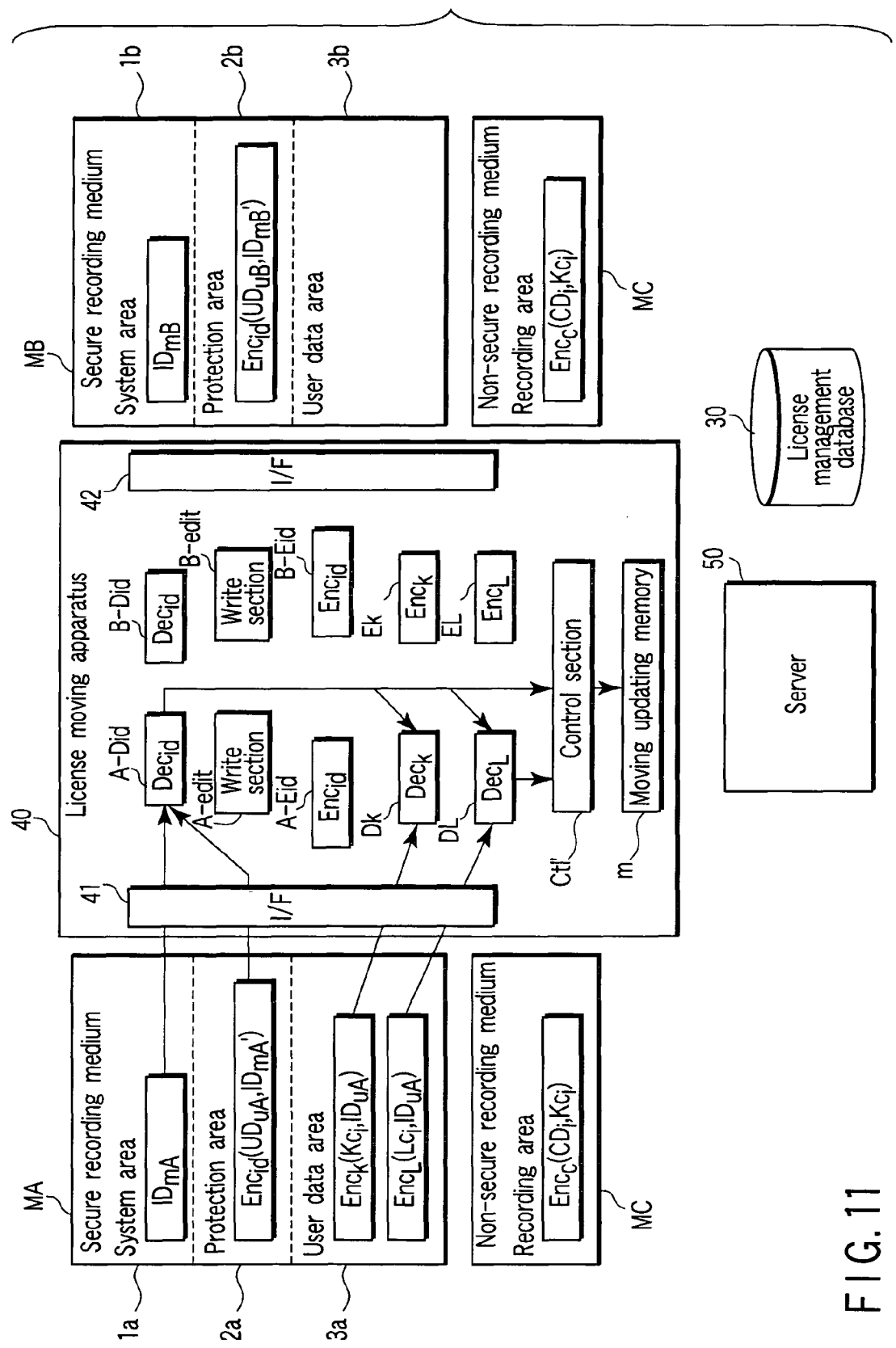
FIGS. 11 to 13 are schematic diagrams for explaining an operation in the embodiment.
Figure 12:
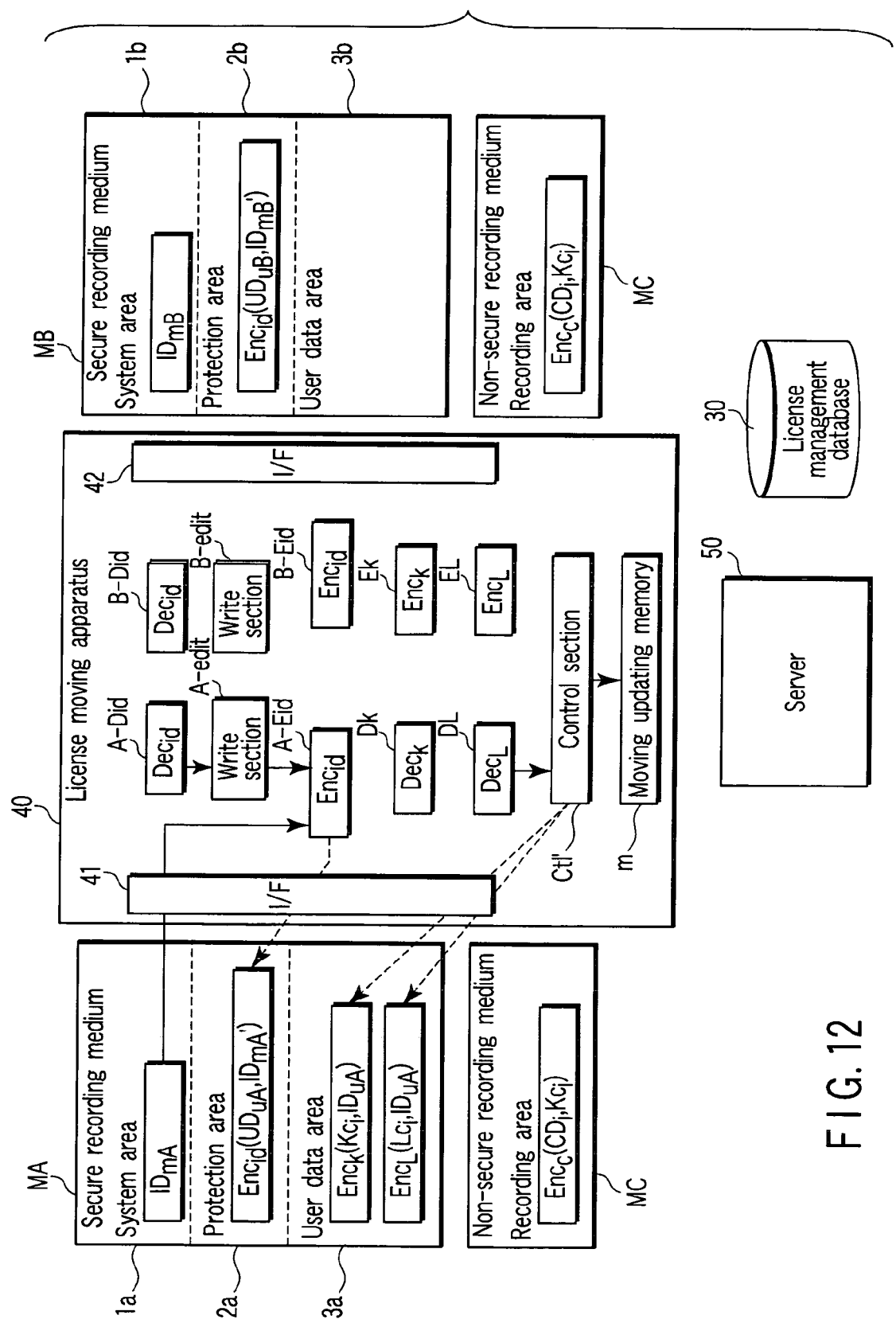
Figure 13:
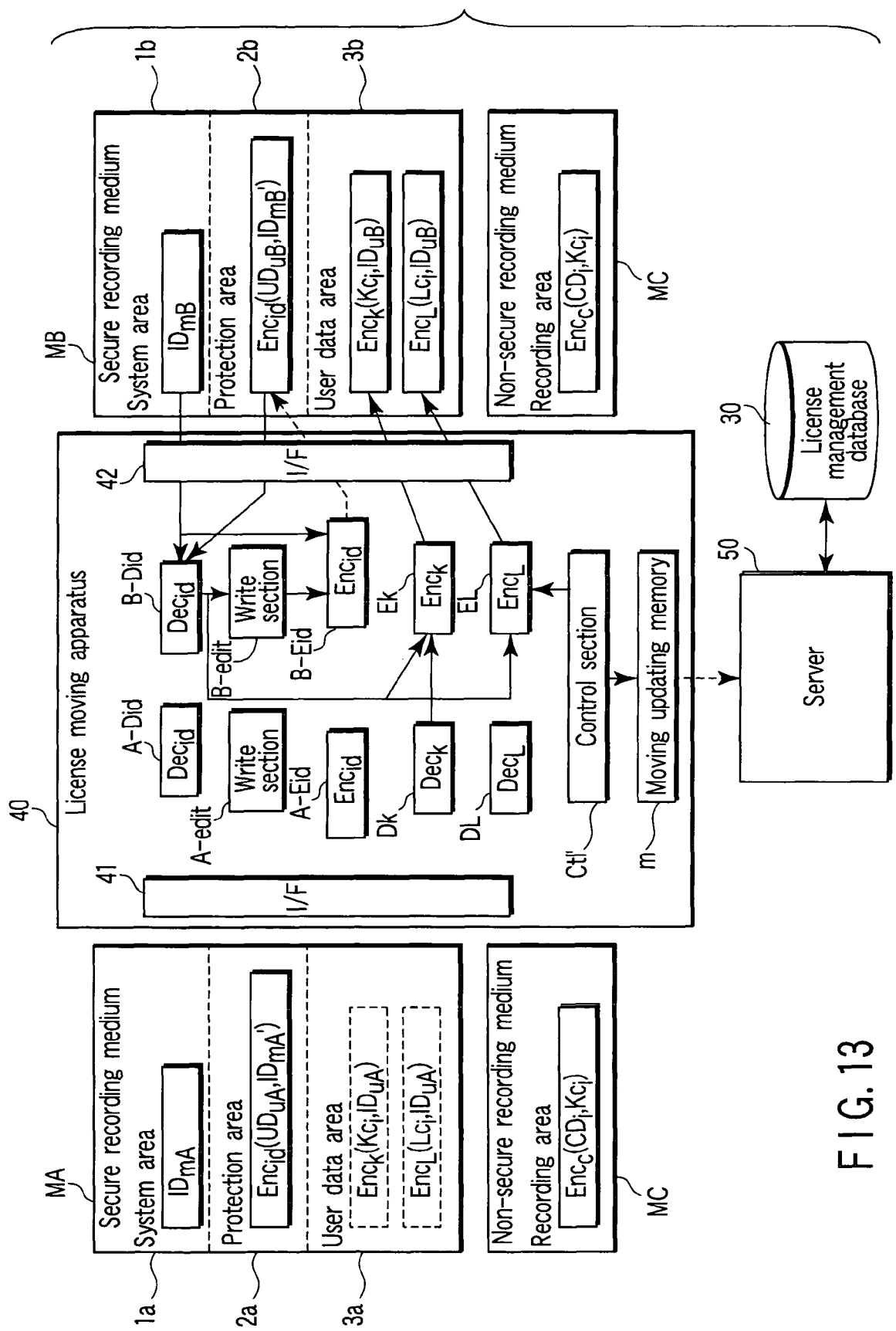

With the above-described configuration, functions and advantageous effect similar to those according to the first embodiment can be obtained as shown in FIGS. 11 to 13.

In more detail, after the similar functions and advantageous effect have been achieved, the license move information Mv is stored in the moving updating memory "m", and the stored content is regularly or irregularly transmitted to a server. Thus, even in an off-line state, license information can be moved from a predetermined secure recording medium MA to another secure recording medium MB and convenience can be improved.

Moreover, in the present embodiment, without being limited to a case of deleting the license information $Lc_i$ contained in the secure recording medium MA defined as a move source, a license move flag is provided in the license information $Lc_i$ as shown in FIG. 14, whereby a current configuration may be modified to a configuration of rewriting a state of the license move flag (unmoved/moved). In addition, in the case of using this license move flag, the embodiment can be easily carried out by using a reserved bit in an existing system.

Third Embodiment

Figure 15:
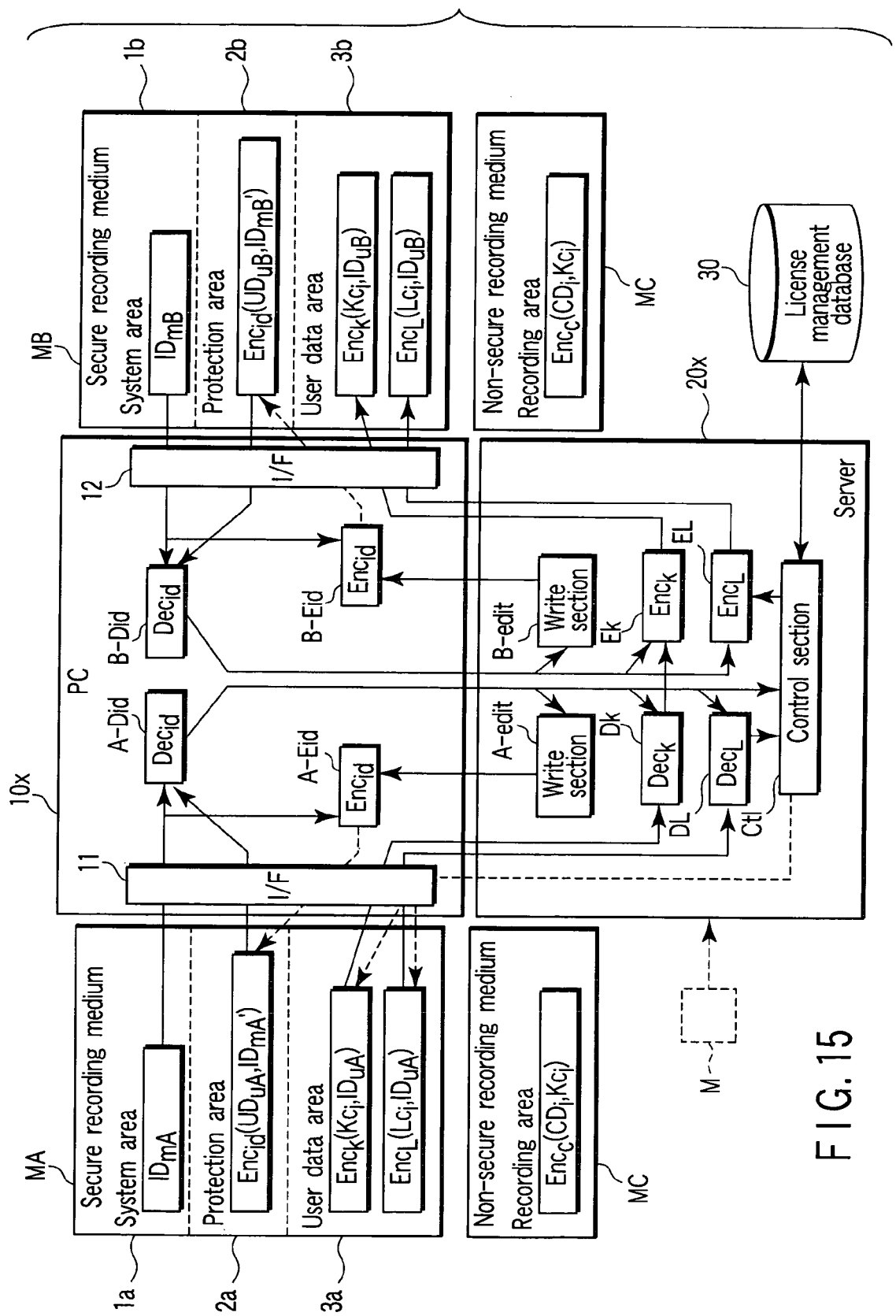
FIG. 15 is a schematic diagram showing a configuration of a license moving system and a recording medium according to a third embodiment of the present invention.

FIG. 15 is a schematic diagram showing a configuration of a license system and a recording medium according to a third embodiment of the present invention.

The present embodiment is a modified example of the first embodiment in which the function of the server 20 described above is partially shared by a personal computer PC and is composed of a personal computer PC 10x and a server 20x.

From among the functions of the server 20 described previously, decoding sections $A_{-Did}$, $B_{-Did}$ and encoding sections $A_{-Eid}$, $B_{-Eid}$, of a system "id", have been added to the personal computer PC 10x.

In the server 20x, a function added to the personal computer PC 10x has been deleted from among the functions described previously. In other words, there are provided: rewrite sections $A_{-edit}$, $B_{-edit}$ of user information $UD_{uA}$, $UD_{uB}$; a decoding section Dk and an encoding section Ek of a system "k"; a decoding section $D_L$ and an encoding section $E_L$ of a system L; and a control section Ctl.

Figure 16:
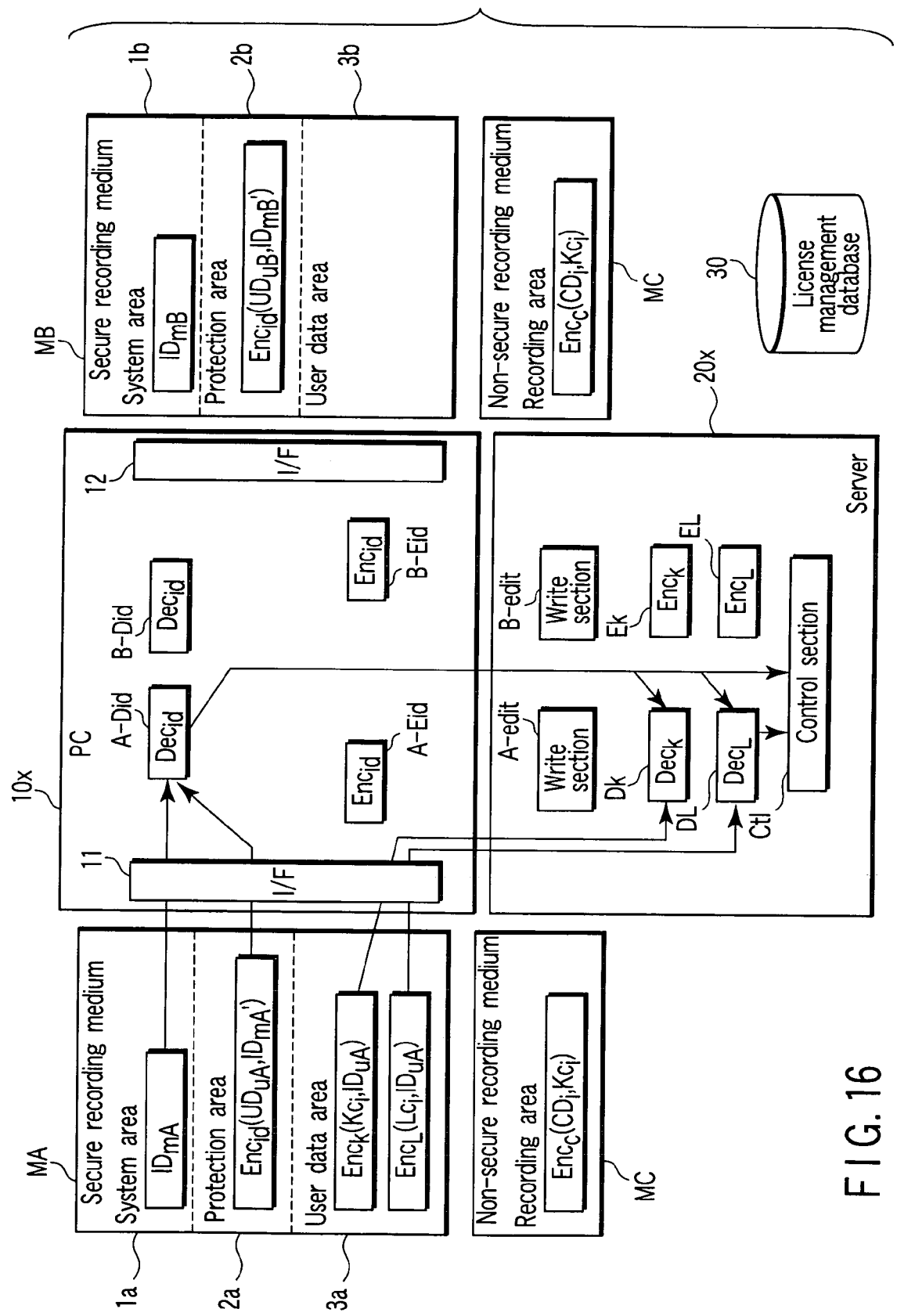
Figure 17:
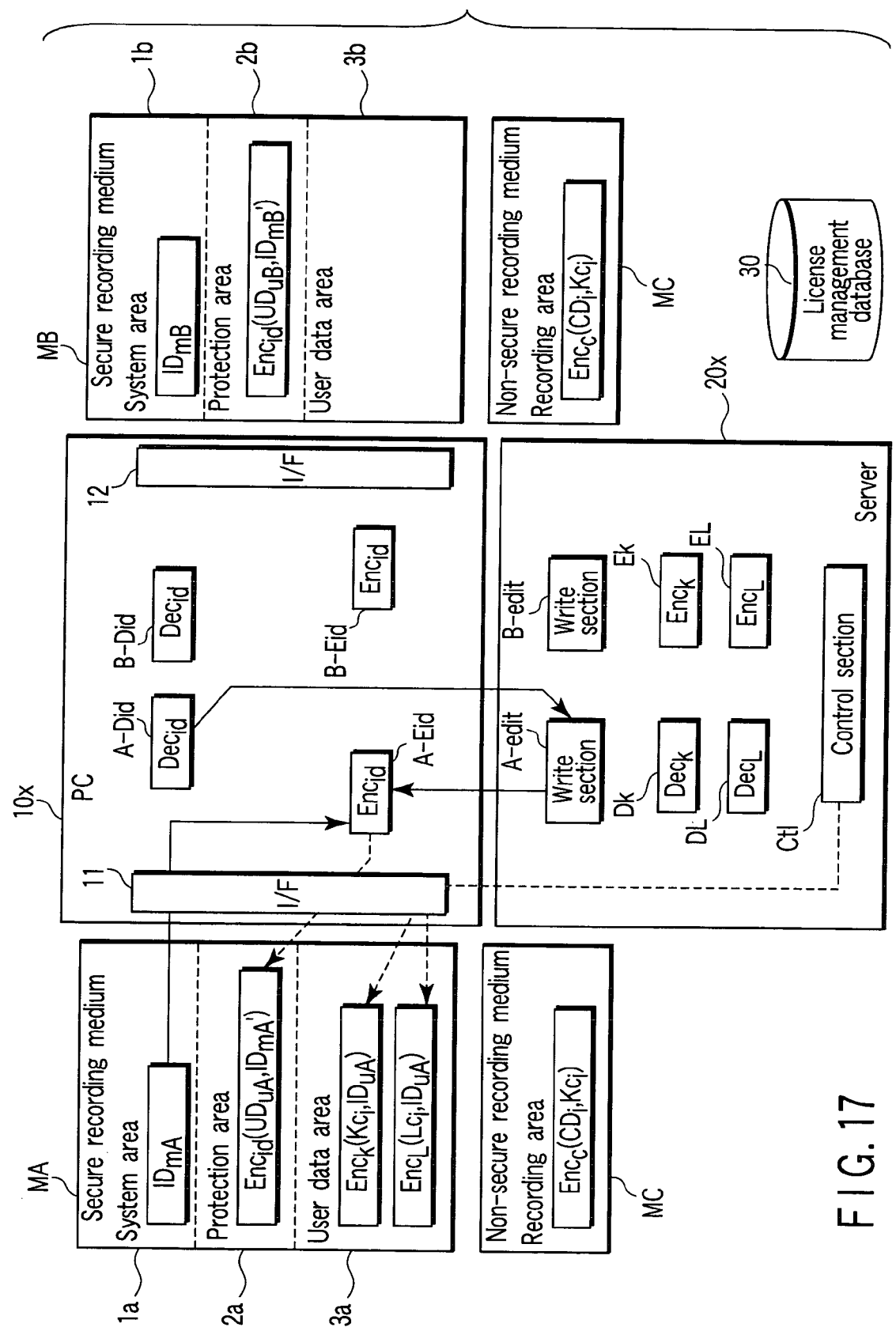

With the configuration as described above, similar functions can be achieved as shown in FIGS. 16 to 18, whereby an advantageous effect similar to that according to the first embodiment can be achieved.

By improving the above-described first to third embodiments, respectively, it is possible, as an improved example of the second embodiment is shown in FIG. 19, to move license information or content to a content protecting system using a recording medium (FIG. 19: HD) having its large memory capacity, like an HDD or a CD-R/DVD-R from a content protecting system using a portable medium (FIG. 19: MA') having its restricted content recording memory capacity.

In addition, a license moving system shown in FIG. 19 can move license information or the like between recording media for which mutually different recording formats are used, and shows a license moving apparatus 40x which comprises a converter section 60 for converting a data recording system.

In the case where, for example, software is used, the converter section 60 of this type may include: a procedure of specifying a recording format of a secure recording medium MB defined as a move destination based on a recording medium identifier $ID_{mB}'$ of the secure medium MB; and a procedure of carrying out conversion so as to meet this specified recording format and properly encoding license information after converted to execute rewriting. As an example, the mutually different recording formats include: a recording format in which license information and content key information are separate as described previously; and a recording format in which license information $Lc_i$ is included in content key information $Kc_i$. Without being limited to this example, if the recording formats are not compatible with each other (for example, recording formats of different systems or recording formats of different versions of the same system), they are included in "mutually different recording formats".

A specific example of the converter section 60 will be supplementally described with respect to FIGS. 20 and 21.

FIG. 20 is a schematic diagram in the case where license information is moved from a current SD card system (left side in the figure) to a content utilizing system of the Inventors (left side in the figure). Here, in a secure recording medium MA' of the SD card system, an encoded content key $Enc_{id}$($Kc_i$, $ID_{mA'}$) and encoded license information $Enc_{id}$($LC_i$, $ID_{mA'}$) are recorded in a protection area 2a, and encoded content $Enc_C$($CD_i$, $Kc_i$) are recorded in a user data area 3a, unlike the above-mentioned secure recording medium MA of the Inventors. The encoded content key and the encoded license information contained in the SD card system are encoded by an encoding system "id" based on a medium identifier $ID_{mA'}$.

In the content utilizing system of the Inventors, on the other hand, the encoded content key $Enc_k$($Kc_i$, $ID_{uB}$) and the encoded license information $Enc_L$($Lc_i$, $ID_{uB}$) are recorded in a user data area 3b of the secure recording medium MB, as described previously. Further, in this content utilizing system, encoded content $Enc_C$($CD_i$, $Kc_i$*) are recorded in a non-secure recording medium MC.

Therefore, the converter section 60 specifies a recording format of the SD card system defined as a move source and a recording format of the content utilizing system defined as a move destination in accordance with medium identifiers $ID_{mA}$, $ID_{mB}$ or a user's operation, and selects prepared encoding systems id, k, L based on the specified content, thereby making it possible to convert a recording format.

FIG. 21 shows an example which is reversed from that of FIG. 20. FIG. 21 is a schematic diagram in the case where license information is moved from the content utilizing system of the Inventors (right side in the figure) to the current SD card system (left side in the figure). Even in the reversed case, of course, the converter section 60 functions in the same way. In FIG. 21, reference numeral F designates a predetermined key generating process.

Note that the techniques described in the above-described respective embodiments are stored as programs which can be executed by computers in recording media such as magnetic disks (floppy (registered trademark) disks, hard disks, and the like), optical disks (CD-ROM/DVD and the like), optical magnetic disks (MO), semiconductor memories, and the like, and can be distributed.

Further, as the recording media, recording media which can store programs therein and out which computers can read may have any form of the storing system.

Further, middle ware (MW) or the like such as operating system (OS), database management software, network software, or the like, which is working on a computer on the basis of an instruction of the program installed in the computer from the storage medium may execute some of the respective processing for realizing the present embodiment.

Moreover, the recording media in the present invention are not limited to media independent of the computer, and recording media in which a program transmitted by LAN, Internet, or the like is downloaded, and stored or temporarily stored are included therein.

Further, the storage medium is not limited to one, and a case where the processing in the present embodiment are executed from a plurality of media is included in the storage medium in the present invention, and the medium configuration may be any configuration.

Note that, the computer in the present invention is to execute the respective processing in the present embodiment on the basis of the program stored in the storage medium, and may be any configuration of an apparatus formed from one such as a personal computer, a system in which a plurality of apparatuses are connected through a network, and the like.

Note that the computer in the present invention is not limited to a personal computer, and includes an arithmetic processing device, a microcomputer, and the like included information processing equipment, and is general term for equipment/apparatus which can realize the functions of the present invention by the program.

Note that the present invention is not limited to the above-described embodiments as are, and structural requirements can be modified and materialized within a range which does not deviate from the gist of the present invention at the practical phase. Further, various inventions can be formed due to the plurality of structural requirements which have been disclosed in the above-described embodiments being appropriately combined. For example, several structural requirements may be eliminated from all of the structural requirements shown in the embodiments. Moreover, structural requirements over different embodiments may be appropriately combined.

Also, the present invention can be modified in many ways to be embodied without departing from its scope.

According to the present invention, there can be provided a license moving apparatus and program capable of moving license information from a predetermined recording medium to another recording medium and capable of improving convenience.

What is claimed is:

1. A non-transitory computer readable storage medium including computer executable instructions to be executed in a server device for moving license information for playing encoded content from a first recording medium to a second recording medium via a terminal device, the computer readable storage medium comprising:

first computer executable instructions to cause a computer to execute a process of receiving from the terminal device a first medium identifier, first encoded user information, a first encoded content key, and first encoded license information read from the first recording medium;

second computer executable instructions to cause a computer to execute a first process of decoding the first encoded user information based on the first medium identifier to obtain first user information;

third computer executable instructions to cause a computer to execute a second process of decoding the first encoded license information based on a first user ID contained in the first user information to obtain first license information;

fourth computer executable instructions to cause a computer to execute a third process of decoding the first encoded content key based on the first user ID contained in the first user information to obtain a content key;

fifth computer executable instructions to cause a computer to execute a process of receiving from the terminal device a second medium identifier and second encoded user information read from the second recording medium;

sixth computer executable instructions to cause a computer to execute a fourth process of decoding the second encoded user information based on the second medium identifier to obtain second user information;

seventh computer executable instructions to cause a computer to execute a process of rewriting the first license information into second license information based on the second user information;

eighth computer executable instructions to cause a computer to execute a process of encoding the second license information based on a second user ID contained in the second user information to obtain second encoded license information;

ninth computer executable instructions to cause a computer to execute a process of transmitting the second encoded license information to the terminal device; and tenth computer executable instructions to cause a computer to execute a process of encoding the content key based on a second user ID contained in the second user information to obtain a second encoded content key;

eleventh computer executable instructions to cause a computer to execute a process of transmitting the second encoded content key to the terminal device; and twelfth computer executable instructions to cause a computer to execute a process of storing a set of a second license ID included in the second license information and the second medium identifier and the second user ID; and wherein the encoded content is stored in a third recording medium.

2. The computer readable storage medium according to claim 1, wherein the first user information includes a content ID which corresponds to all the first encoded license information contained in the first recording medium.

3. The computer readable storage medium according to claim 2, wherein the first user information includes protection management information on corresponding encoded content for said content ID.

4. The computer readable storage medium according to claim 1, wherein the seventh computer executable instructions include:
   a first procedure of determining whether or not the first license information is invalid;
   a second procedure of, when the determining shows invalidity, stopping license movement.

5. The computer readable storage medium according to claim 1, wherein the seventh computer executable instructions include:
   a procedure of specifying a recording format of the second recording medium based on the second medium identifier; and
   a procedure of executing the rewriting so as to meet the specified recording format.

6. A license moving apparatus for moving license information for playing encoded content from a first recording medium to a second recording medium, the apparatus comprising:

means for reading a first medium identifier, first encoded user information, a first encoded content key, and first encoded license information from the first recording medium;

means for decoding the first encoded user information based on the first medium identifier to obtain first user information;

means for decoding the first encoded license information based on a first user ID contained in the first user information to obtain first license information;

means for decoding the first encoded content key based on the first user ID contained in the first user information to obtain a content key;

means for reading a second medium identifier and second encoded user information from the second recording medium;

means for decoding the second encoded user information based on the second medium identifier to obtain second user information:

means for rewriting the first license information into second license information based on the second user information;

means for encoding the second license information based on a second user ID contained in the second user information to obtain second encoded license information;

means for writing the second encoded license information into the second recording medium;

means for encoding the content key based on a second user ID contained in the second user information to obtain second encoded content key;

means for writing the second encoded content key into the second recording medium;

a memory which temporarily stores a set of a second license ID included in the second license information and the second medium identifier and the second user ID; and means for regularly or irregularly transmitting the set stored in the memory to a server; and wherein the encoded content is stored in a third recording medium.

7. The license moving apparatus according to claim 6, wherein the first user information includes a content ID which corresponds to all the first encoded license information contained in the first recording medium.

8. The license moving apparatus according to claim 7, wherein the first user information includes protection management information on corresponding encoded content for said each content ID.

9. The license moving apparatus according to claim 6, wherein the means for rewriting the first license information into the second license information comprises:
   means for determining whether or not the first license information is valid; and
   means for, when the determination result shows invalidity, stopping license movement.

10. The license moving apparatus according to claim 6, wherein the means for rewriting the first license information into the second license information comprises:
   means for specifying a recording format of the second recording medium based on the second medium identifier; and
   means for executing the rewriting so as to meet the specified recording format.

11. A license moving apparatus for moving license information for playing encoded content from a first recording medium to a second recording medium, the apparatus comprising:

means for reading a first medium identifier, first encoded license information, and encoded content information from the first recording medium;
means for decoding the first encoded license information based on the first medium identifier to obtain first license information;
means for reading a second medium identifier and second encoded user information from the second recording medium;
means for decoding the second encoded user information based on the second medium identifier to obtain second user information;
means for rewriting the first license information into second license information based on the second user information;
means for encoding the second license information based on a second user ID contained in the second user information to obtain second encoded license information;
means for writing the second encoded license information into the second recording medium;
means for deleting the first encoded license information and encoded content information;
a memory which temporarily stores a set of a second license ID included in the second license information and the second medium identifier and the second user ID; and
means for regularly or irregularly transmitting the set stored in the memory to a server; and
wherein mutually different recording formats are used in the first recording medium and the second recording medium, the first recording medium uses a first recording format in which the second encoded user information is not included, the second recording medium uses a second recording format in which the second encoded user information is included.

12. A license moving apparatus for moving license information for playing encoded content from a first recording medium to a second recording medium, the apparatus comprising:
means for reading a first medium identifier, first encoded user information, a first encoded content key, and first encoded license information from the first recording medium;
means for decoding the first encoded user information based on the first medium identifier to obtain first user information;
means for decoding the first encoded license information based on a first user ID contained in the first user information to obtain first license information;
means for obtaining first encoded content from a third recording medium, the first encoded content which correspond to the first license information, the third recording medium storing therein in advance the first encoded content obtained when content is encoded by a content key;
means for decoding the first encoded content key based on a first user ID contained in the first user information to obtain the content key;
means for decoding the first encoded content based on the first license information and the content key to obtain the content;
means for reading a second medium identifier from the second recording medium;
means for rewriting the first license information into second license information;
means for encoding the second license information based on the second medium identifier to obtain second encoded license information;
means for writing the second encoded license information into the second recording medium;
means for encoding the content key based on the second medium identifier to obtain second encoded content key;
means for writing the second encoded content key into the second recording medium;
means for encoding the content based on the second license information and the content key to obtain second encoded content;
means for writing the second encoded content into the second recording medium;
means for deleting the first encoded license information and encoded content information;
a memory which temporarily stores a set of a second license ID included in the second license information and the second medium identifier and the second user ID; and
means for regularly or irregularly transmitting the set stored in the memory to a server; and
wherein mutually different recording formats are used in the first recording medium and the second recording medium, the first recording medium uses a first recording format in which the first encoded user information is included, the second recording medium uses a second recording format in which the first encoded user information is not included.

13. A non-transitory computer readable storage medium including computer executable instructions to be executed in a license moving apparatus for moving license information for playing encoded content from a first recording medium to a second recording medium, the computer readable storage medium comprising:
first computer executable instructions to cause a computer to execute a process of reading a first medium identifier, first encoded user information, a first encoded content key, and first encoded license information from the first recording medium;
second computer executable instructions to cause a computer to execute a first process of decoding the first encoded user information based on the first medium identifier to obtain first user information;
third computer executable instructions to cause a computer to execute a second process of decoding the first encoded license information based on a first user ID contained in the first user information to obtain first license information;
fourth computer executable instructions to cause a computer to execute a process of obtaining first encoded content from a third recording medium, the first encoded content which correspond to the first license information, the third recording medium storing therein in advance the first encoded content obtained when content is encoded by a content key;
fifth computer executable instructions to cause a computer to execute a third process of decoding the first encoded content key based on a first user ID contained in the first user information to obtain the content key;
sixth computer executable instructions to cause a computer to execute a fourth process of decoding the first encoded content based on the first license information and the content key to obtain the content;

seventh computer executable instructions to cause a computer to execute a process of reading a second medium identifier and second encoded user information from the second recording medium;

eighth computer executable instructions to cause a computer to execute a fifth process of decoding the second encoded user information based on the second medium identifier to obtain second user information;

ninth computer executable instructions to cause a computer to execute a process of rewriting the first license information into second license information based on the second user information;

tenth computer executable instructions to cause a computer to execute a process of encoding the second license information based on a second user ID contained in the second user information to obtain second encoded license information;

eleventh computer executable instructions to cause a computer to execute a process of writing the second encoded license information into the second recording medium;

twelfth computer executable instructions to cause a computer to execute a process of encoding the content key based on the second medium identifier to obtain second encoded content key;

thirteenth computer executable instructions to cause a computer to execute a process of writing the second encoded content key into the second recording medium;

fourteenth computer executable instructions to cause a computer to execute a process of encoding the content based on the second license information and the content key to obtain second encoded content;

fifteenth computer executable instructions to cause a computer to execute a process of writing the second encoded content into the second recording medium;

sixteenth computer executable instructions to cause a computer to execute a process of deleting the first encoded license information and encoded content information;

seventeenth computer executable instructions to cause a computer to execute a process of temporarily storing in a memory a set of a second license ID included in the second license information and the second medium identifier and the second user ID; and eighteenth computer executable instructions to cause a computer to execute a process of regularly or irregularly transmitting the set stored in the memory to a server; and wherein mutually different recording formats are used in the first recording medium and the second recording medium, the first recording medium uses a first recording format in which the first encoded user information is included, the second recording medium uses a second recording format in which the first encoded user information is not included.

14. The computer readable storage medium according to claim 13, wherein the first user information includes a content ID corresponding to all the first encoded license information contained in the first recording medium.

15. The computer readable storage medium according to claim 14, wherein the first user information includes protection management information on corresponding encoded content for said each content ID.

16. The computer readable storage medium according to claim 13, wherein the ninth computer executable instructions include:

a first procedure of determining whether or not the first license information is invalid; and a second procedure of, when the determination result shows invalidity, stopping license movement.

17. The computer readable storage medium according to claim 13, wherein the ninth computer executable instructions include:

a first procedure of specifying a recording format of the second recording medium based on the second medium identifier; and a second procedure of executing the rewriting so as to meet the specified recording format.

* * * * *